(12) United States Patent
Sato

(10) Patent No.: US 10,525,354 B2
(45) Date of Patent: Jan. 7, 2020

(54) GAME APPARATUS, GAME CONTROLLING METHOD AND STORAGE MEDIUM FOR DETERMINING A TERRAIN BASED ON A DISTRIBUTION OF COLLISION POSITIONS

(71) Applicant: NINTENDO CO., LTD., Kyoto (JP)

(72) Inventor: Katsuhisa Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 228 days.

(21) Appl. No.: 15/617,358

(22) Filed: Jun. 8, 2017

(65) Prior Publication Data

US 2017/0354886 A1   Dec. 14, 2017

(30) Foreign Application Priority Data

Jun. 10, 2016   (JP) .................................. 2016-115873

(51) Int. Cl.
  *A63F 13/00*   (2014.01)
  *A63F 13/56*   (2014.01)

(52) U.S. Cl.
  CPC .................................... *A63F 13/56* (2014.09)

(58) Field of Classification Search
  CPC .................................................... G06T 19/003
  See application file for complete search history.

(56) References Cited

U.S. PATENT DOCUMENTS

| | | | |
|---|---|---|---|
| 6,426,752 B1 * | 7/2002 | Goden ..................... | A63F 13/10 345/473 |
| 6,500,069 B1 | 12/2002 | Ohba et al. | |
| 2002/0019257 A1 * | 2/2002 | Koizumi ................. | A63F 13/10 463/32 |
| 2003/0078086 A1 * | 4/2003 | Matsuyama .......... | A63F 13/573 463/3 |
| 2003/0078138 A1 * | 4/2003 | Toyama ............. | A63B 22/0242 482/8 |
| 2005/0012740 A1 * | 1/2005 | Takahashi ............... | A63F 13/10 345/419 |

(Continued)

FOREIGN PATENT DOCUMENTS

| | | |
|---|---|---|
| JP | 7-230559 | 8/1995 |
| JP | 2000-153062 | 6/2000 |

(Continued)

OTHER PUBLICATIONS

Bellone et al., "A New Approach for Terrain Analysis in Mobile Robot Applications", 2013, pp. 225-230 (Year: 2013).*

*Primary Examiner* — Phong X Nguyen
(74) *Attorney, Agent, or Firm* — Nixon & Vanderhye P.C.

(57) ABSTRACT

A non-limiting example game system includes a game apparatus, and a terminal device and a television are connected to the game apparatus. A game image to be displayed on the television is an image that various kinds of objects arranged in a virtual space are imaged by a virtual camera. A determination object of a three-dimensional shape in a traveling direction of a player object is sequentially moved from a start position that differs for each time to a target position that is decided according to a predetermined rule, and terrain (inclination and height of the ground) in the traveling direction of the player object based on a principal component analysis of a plurality of positions that the determination object collides with a terrain object is determined.

16 Claims, 32 Drawing Sheets

(56) References Cited

U.S. PATENT DOCUMENTS

| | | | | |
|---|---|---|---|---|
| 2009/0083671 | A1* | 3/2009 | Fitzmaurice | G06F 3/04815 |
| | | | | 715/851 |
| 2009/0104990 | A1 | 4/2009 | Tsujino et al. | |
| 2010/0251185 | A1* | 9/2010 | Pattenden | A63F 13/10 |
| | | | | 715/849 |
| 2010/0268457 | A1* | 10/2010 | McCrae | G06T 15/30 |
| | | | | 701/408 |
| 2011/0074768 | A1* | 3/2011 | Takayama | G06T 13/80 |
| | | | | 345/419 |
| 2013/0158966 | A1* | 6/2013 | Baek | G06F 17/5009 |
| | | | | 703/6 |
| 2013/0342533 | A1* | 12/2013 | Bell | G06T 19/003 |
| | | | | 345/420 |
| 2015/0005785 | A1* | 1/2015 | Olson | A61B 34/32 |
| | | | | 606/130 |
| 2016/0243443 | A1* | 8/2016 | Chuaypradit | A63F 13/577 |
| 2016/0347386 | A1* | 12/2016 | Matsunami | G05D 1/024 |

FOREIGN PATENT DOCUMENTS

| | | |
|---|---|---|
| JP | 3467487 | 11/2003 |
| JP | 3706393 | 10/2005 |
| JP | 2007-272267 | 10/2007 |
| JP | 2009-22553 | 2/2009 |
| JP | 5157329 | 3/2013 |
| JP | 2015-61616 | 4/2015 |
| WO | 97/46970 | 12/1997 |

\* cited by examiner

FIG. 4
GAME SCREEN 100
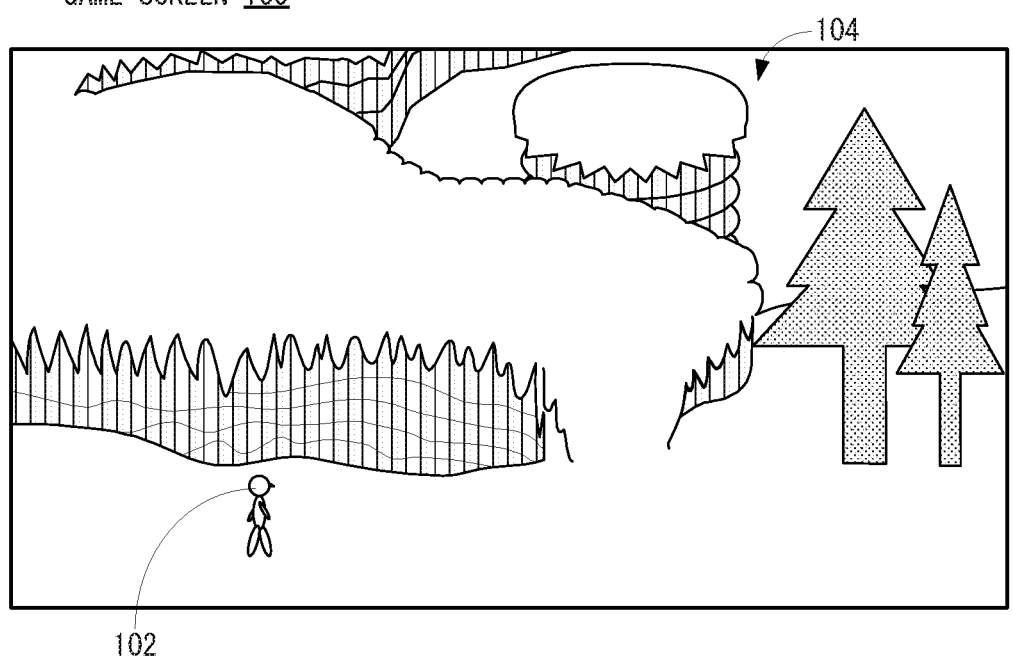
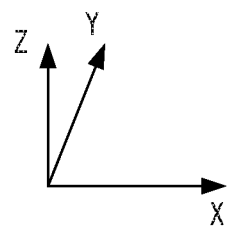
WORLD COORDINATE SYSTEM

START POSITIONS

DECISION OF TARGET POSITION OF FIRST TIME

RESULT OF FIRST TIME

DECISION OF TARGET POSITION OF SECOND TIME

RESULT OF SECOND TIME

DECISION OF TARGET POSITION OF THIRD TIME

RESULT OF THIRD TIME

WHEN VIEWING FROM ABOVE     TRAVELING DIRECTION

WHEN VIEWING FROM BACK

WHEN VIEWING FROM ABOVE

WHEN VIEWING FROM BACK

FIRST TIME

PERFORMING DETERMINATION OF CLIFF SIDE DETERMINATION

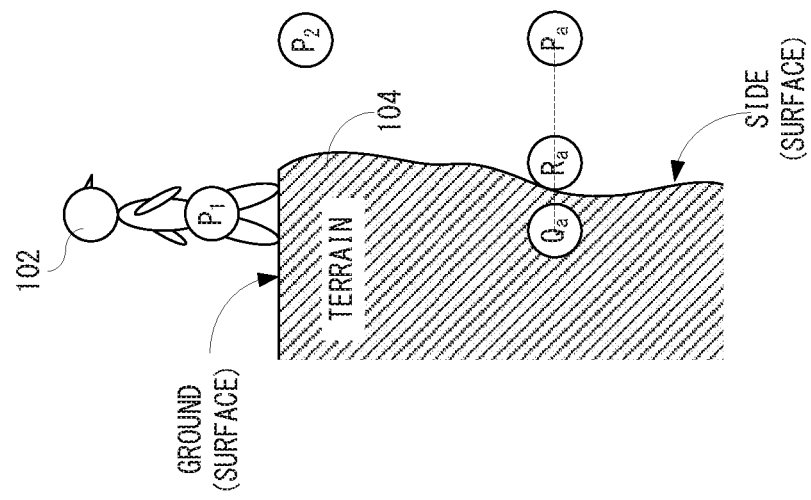
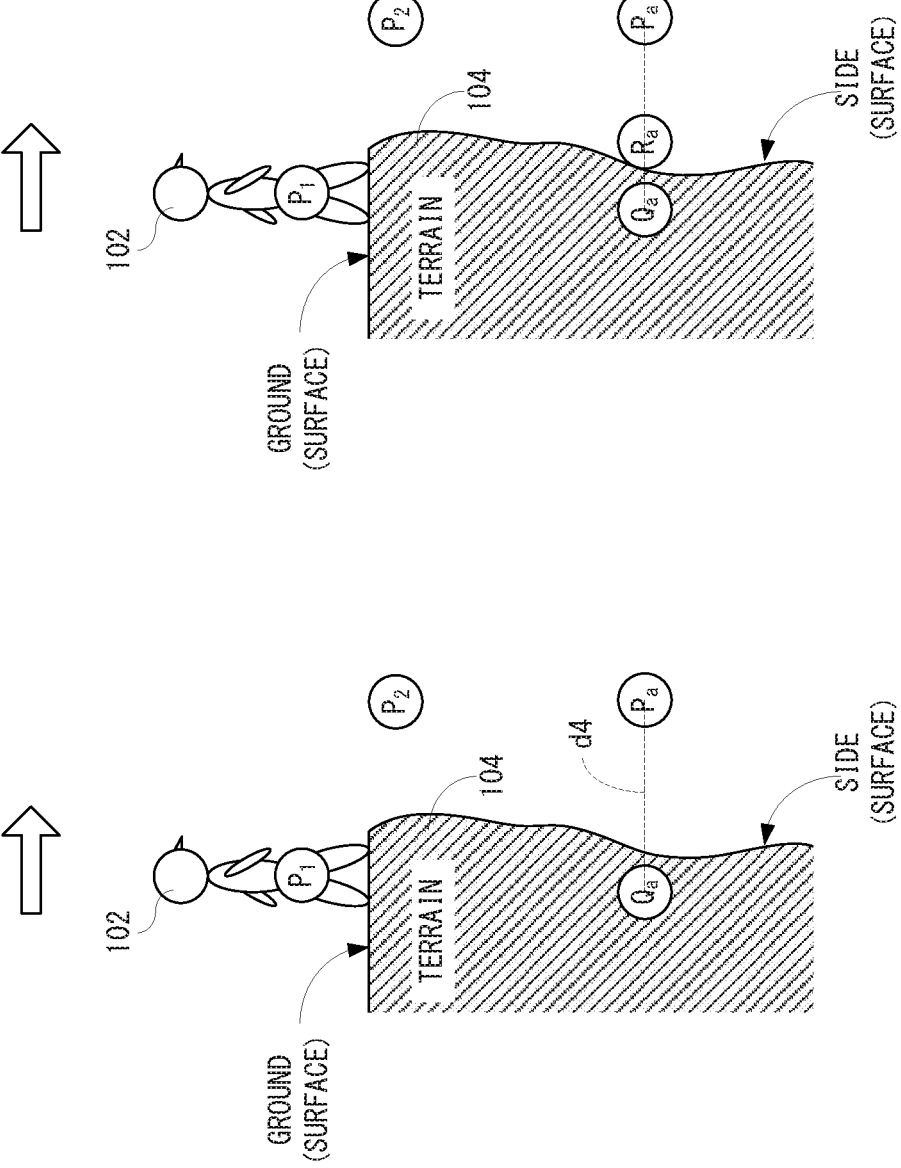

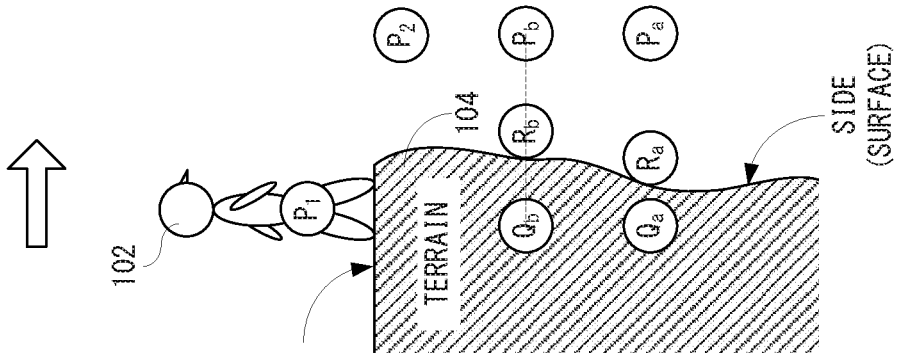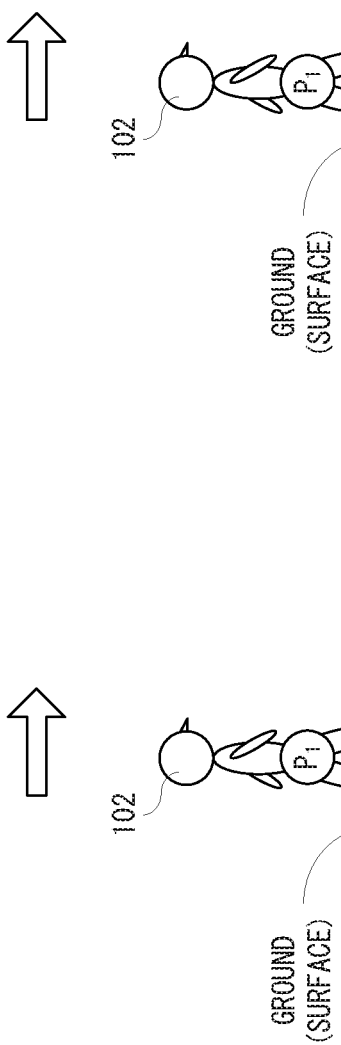

AFTER TERMINATION OF ALL CASTING

FIRST TIME OF EXPANDED CLIFF SIDE DETERMINATION

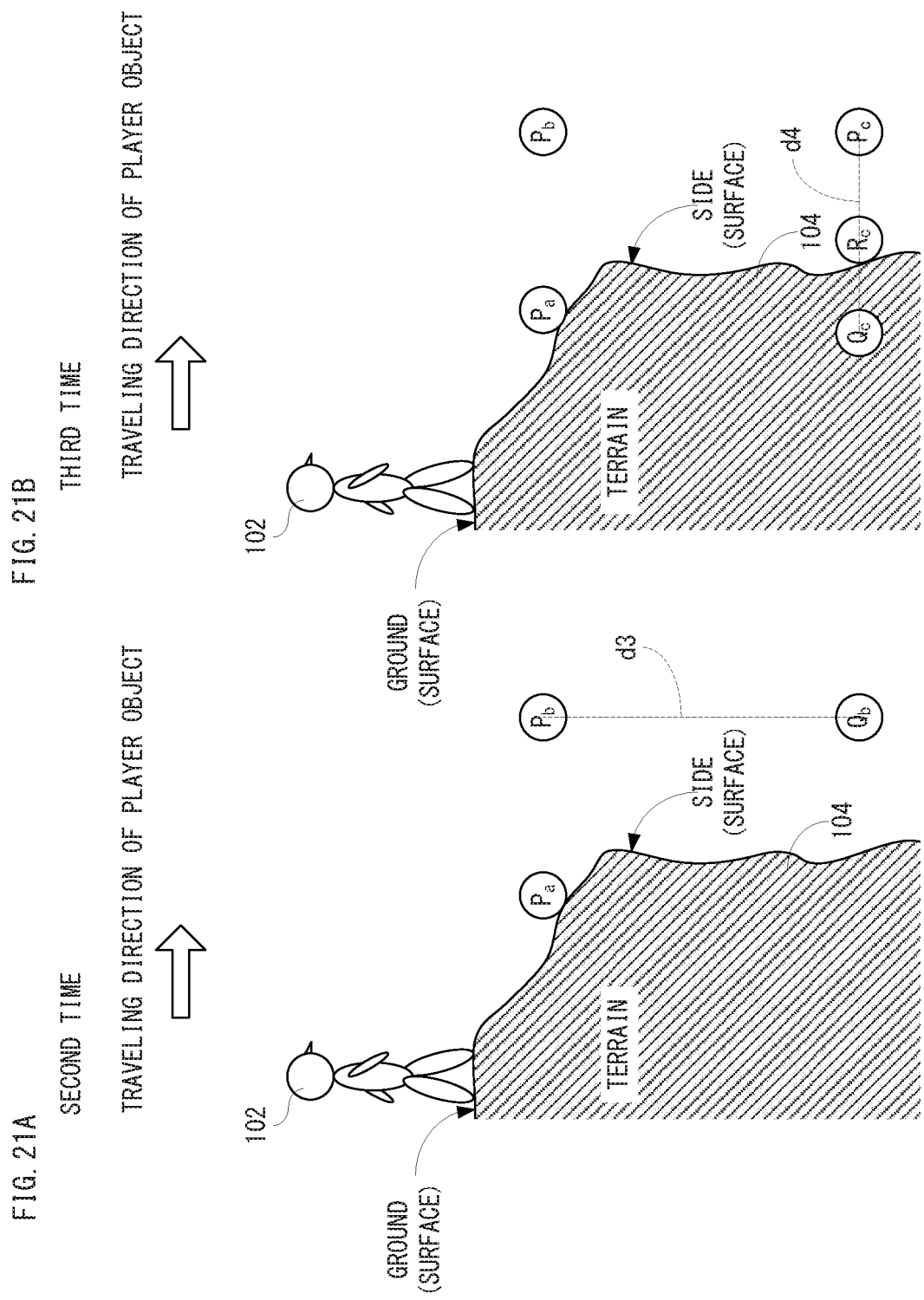

GAME APPARATUS, GAME CONTROLLING METHOD AND STORAGE MEDIUM FOR DETERMINING A TERRAIN BASED ON A DISTRIBUTION OF COLLISION POSITIONS

CROSS REFERENCE OF RELATED APPLICATION

The disclosure of Japanese patent application No. 2016-115873 filed on Jun. 10, 2016 is incorporated by reference.

FIELD

This application describes a game apparatus, a game controlling method, and a storage medium, which produces a game image to be displayed on a display.

SUMMARY

It is a primary object of an embodiment(s) is to provide a novel game apparatus, game controlling method and storage medium.

Moreover, it is another object of the embodiment(s) is to provide a game apparatus, game controlling method and storage medium, capable of determining terrain automatically.

A first embodiment is a game apparatus, comprising a terrain arrangement portion, a character movement control portion, a calculation portion, a terrain determination portion, and a game processing portion. The terrain arrangement portion is configured to arrange terrain objects in a virtual space. The terrain object is also called, for example, a background object, and means various kinds of objects such as a flat plane, a hill (slope), a floor, a wall, a cliff, a tree, etc. The character movement control portion is configured to move a character object in the virtual space based on an operation of a player. The calculation portion is configured to calculate collision positions that a plurality of determination regions having a three-dimensional shape collide with the terrain object respectively in case that the determination regions are moved in directions that are respectively decided according to predetermined rules from a plurality of positions that are relatively set from a position of the character object. However, it is unnecessary to actually move the determination regions in the virtual space, and it is determined whether the determination regions collide with the terrain object on the assumption that the determination regions are moved, and the collision positions are calculated (acquired) in a case of colliding. The terrain determination portion is configured to determine, based on a distribution of a plurality of collision positions, terrain of the terrain object within a predetermined range from the position of the character object. The game processing portion is configured to perform predetermined game processing according to terrain that is determined by the terrain determination portion. For example, an animation of the character object is changed according to the terrain. Moreover, a movement speed of the character object is changed. Furthermore, display of a graphical user interface for selecting an action to be performed by the character object is controlled.

According to the first embodiment, since terrain of the terrain object is determined based on the collision positions that a plurality of determination regions collide with the terrain object, it is possible to automatically determine terrain without storing motion data in a polygon constituting the terrain object.

A second embodiment is the game apparatus according to the first embodiment, wherein the determination regions have a spherical shape.

According to the second embodiment, since the determination region has a spherical shape, it is sufficient to only determine whether a terrain object exists at a position corresponding to a length of a radius of the determination region in a path that the determination region moves, for example, and therefore, determination processing is simple.

A third embodiment is the game apparatus according to the first embodiment, wherein the character movement control portion is configured to further control a direction of the character object based on an operation of the player. The calculation portion is configured to calculate collision position in case of moving the determination region from start position that is set in association with the position of the character object toward target position that is decided to a side of the traveling direction of the character object.

According to the third embodiment, since terrain in the traveling direction of the character object is determined automatically, it is possible to perform predetermined processing appropriately.

A fourth embodiment is the game apparatus according to the third embodiment, wherein the calculation portion is configured to respectively calculate collision positions in case of respectively moving the plurality of determination regions by deciding, based on the collision position that is calculated in association with a predetermined determination region, a next target position for the determination region to a side of the traveling direction of the character object.

According to the fourth embodiment, since a next target position in the traveling direction of the character is decided by using a previous collision position of the determination region, it is possible to decide a target position appropriately according to a change of the terrain. Therefore, it is possible to accurately determine terrain.

A fifth embodiment is the game apparatus according to the fourth embodiment, wherein the calculation portion is configured to decide a position as a next target position for the determination region, the position being a position that is further shifted from a position that the determination region is moved by a first predetermined amount from the collision position in a direction opposite to a normal direction of the terrain object at the collision position, by a second predetermined amount in a direction perpendicular to the direction of the normal and in the traveling direction of the character object.

A sixth embodiment is the game apparatus according to the fourth embodiment, wherein the calculation portion is configured to decide a position as a next target position for the determination region, the position being a position that is further shifted from a position that a determination object is moved by a first predetermined amount from the collision position in a direction perpendicular to a direction of a normal of the terrain object at the collision position and in the traveling direction of the character object, by a second predetermined amount in a vertically downward direction.

A seventh embodiment is the game apparatus according to the fifth embodiment, wherein the normal direction is recalculated based on an outer product of the normal direction of the terrain object and a just beside direction of the traveling direction of the character object.

According to the seventh embodiment, even when the character object is standing on a slope inclined in the lateral direction with respect to the traveling direction, a deviation can be eliminated and the target position can be set toward the traveling direction.

An eighth embodiment is the game apparatus according to the first embodiment, wherein the terrain determination portion is configured to calculate at least an inclination of the terrain based on a distribution of a plurality of collision positions. The game processing portion is configured to perform the game processing that controls the character object so as to perform an animation according to the inclination of the terrain that is determined by the terrain determination portion.

According to the eighth embodiment, since the character object is displayed with the animation according to the inclination of the terrain, it is possible to eliminate as much as possible a sense of discomfort in a movement of the character object.

A ninth embodiment is the game apparatus according to the eighth embodiment, wherein the terrain determination portion is configured to perform a principal component analysis of the distribution of the plurality of collision positions so as to calculate the inclination of the terrain based on the principal component analysis.

According to the ninth embodiment, since the inclination of the terrain is calculated based on the principal component analysis, it is possible to easily estimate approximate terrain.

A tenth embodiment is the game apparatus according to the eighth embodiment, wherein the terrain determination portion is configured to calculate a regression line based on the distribution of the plurality of collision positions so as to calculate the inclination of the terrain from the regression line.

According to the tenth embodiment, it is also possible to know the inclination of the terrain by evaluating the regression line.

An eleventh embodiment is the game apparatus according to the third embodiment, wherein the calculation portion is configured to determine, when a processing result in a case of moving the determination region toward a target position from a start position satisfies a predetermined condition, whether there is the terrain that is looked down from the character object in the traveling direction of the character object. For example, it is determined whether a cliff or a wall exists (is arranged) in the traveling direction of the character object so that the character object looks down.

According to the eleventh embodiment, it is possible to determine whether the terrain that is looked down from the character object is arranged as needed.

A twelfth embodiment is the game apparatus according to the eleventh embodiment, wherein the calculation portion is configured to decide, when there is no position that collides with the terrain in a case of moving the determination region toward the target position from the start position, the target position as a next start position for the determination region and a next target position for the determination region in downward direction from the next start position for the determination region.

A thirteenth embodiment is the game apparatus according to the twelfth embodiment, wherein the calculation portion is configured to perform first determination processing that determines a side of the terrain to be looked down when there is no position that collides with the terrain in a case of moving the determination region toward the next target position from the next start position for the determination region.

A fourteenth embodiment is the game apparatus according to the eleventh embodiment, wherein the calculation portion is configured to perform second determination processing that determines a side of the terrain to be looked down when a positional relation with the character object among a plurality of collision positions calculated in a case of moving a plurality of determination regions has a predetermined relationship.

A fifteenth embodiment is a game controlling method in a game apparatus comprising a terrain arrangement portion that arrange terrain objects in a virtual space and a character movement control portion that moves a character object in the virtual space based on an operation of a player, comprising steps of: (a) calculating collision positions that a plurality of determination regions having a three-dimensional shape collide with the terrain object relatively in case that the determination regions are moved in directions that are respectively decided according to predetermined rules from a plurality of positions that are relatively set from a position of the character object; (b) determining terrain of the terrain object within a predetermined range from the position of the character object based on a distribution of the plurality of collision positions; and (c) performing predetermined game processing according to terrain that is determined in the step (b).

A sixteenth embodiment is a non-transitory storage medium storing a game program to be executed by a computer, wherein the game program causes one or more processors to perform: a terrain arrangement step arranging terrain objects in a virtual space; a character movement control step moving a character object in the virtual space based on an operation of a player; a calculation step calculating collision positions that a plurality of determination regions having a three-dimensional shape collide with the terrain object relatively in case that the determination regions are moved in directions that are respectively decided according to predetermined rules from a plurality of positions that are relatively set from a position of the character object; a terrain determination step determining terrain of the terrain object within a predetermined range from the position of the character object based on a distribution of a plurality of collision positions, terrain of the terrain object; and a game processing step performing predetermined game processing according to terrain that is determined in the terrain determination step.

Also in the fifteenth and sixteenth embodiments, like the first embodiment, it is possible to automatically determine terrain.

The above described objects and other objects, features, aspects and advantages of the embodiments will become more apparent from the following detailed description when taken in conjunction with the accompanying drawings.

BRIEF DESCRIPTION OF THE DRAWINGS

FIG. 4 is an illustration view showing a non-limiting example game screen that a scene in which various kinds of objects arranged in a virtual space is imaged with a virtual camera.

FIG. 18A is an illustration view showing a non-limiting method for deciding a start position and a target position at a first time for the determination object when starting the cliff side determination processing, and FIG. 18B is an illustration view showing the collision position at the first time.

FIG. 19A is an illustration view showing a non-limiting method for deciding a start position and a target position at a second time for the determination object in the cliff side determination processing subsequent to FIG. 18B, and FIG. 19B is an illustration view showing the collision position at the second time.

FIG. 21A is an illustration view showing a non-limiting method for deciding a start position and a target position at a second time for the determination object in the expanded cliff side determination processing, and FIG. 21B is an illustration view showing a non-limiting method for deciding a start position and a target position and the collision position at a third time for the determination object.

DETAILED DESCRIPTION OF NON-LIMITING EXAMPLE EMBODIMENTS

Figure 1:
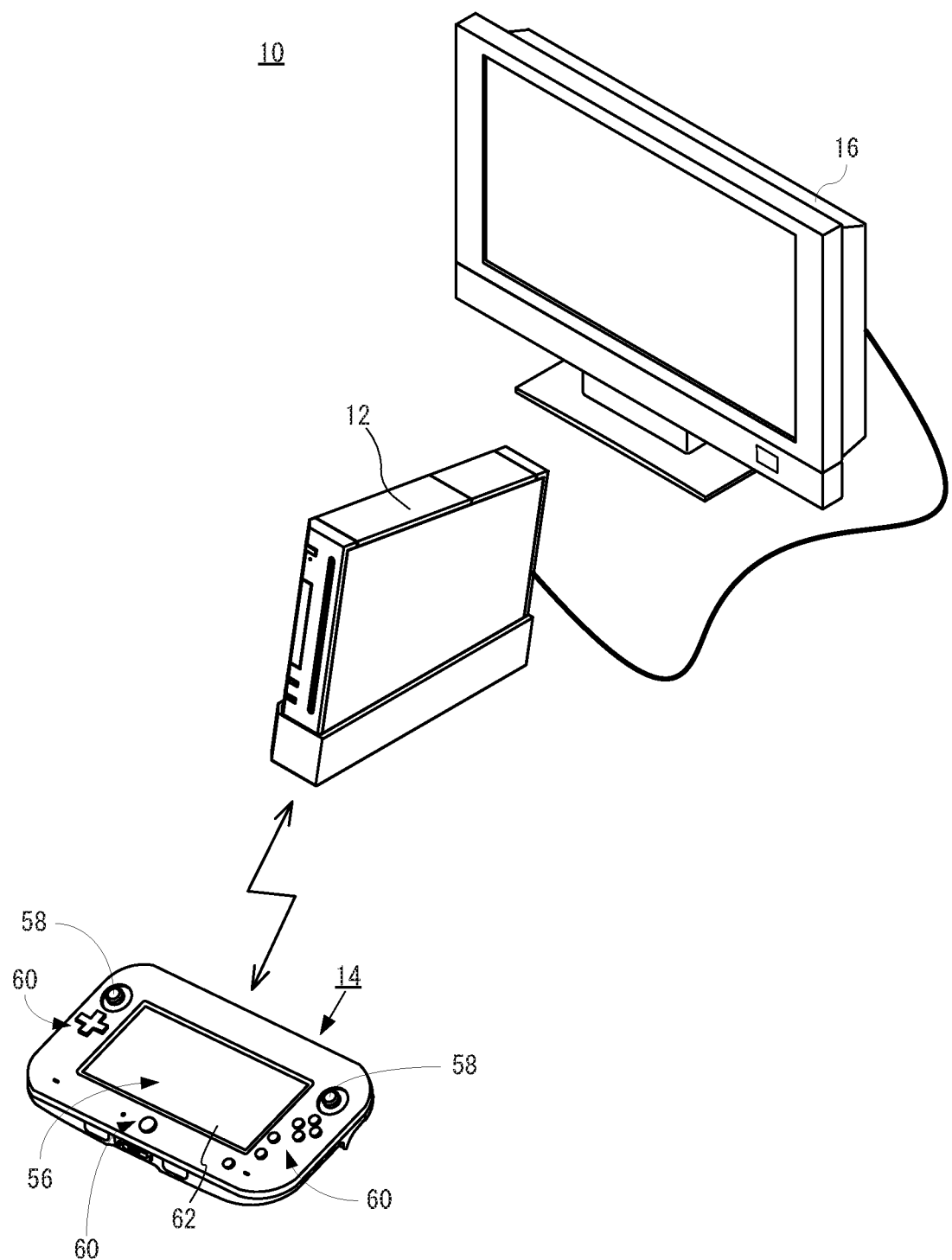
FIG. 1 is an illustration view showing a non-limiting example appearance of a game system.

In the following, a non-limiting example game system 10 according to an embodiment with reference to drawings. The game system 10 shown in FIG. 1 includes a stationary game apparatus 12 and a portable terminal device 14. Moreover, the game system 10 includes a stationary display device 16 typified by a television receiver or the like (hereinafter, referred to as "television"), and a game apparatus 12 and the television 16 are connected to each other via a connection cord. The game system 10 performs game processing in the game apparatus 12 based on a game operation using the terminal device 14, and displays a game image obtained by the game processing on the television 16 and/or the terminal device 14.

Although illustration is omitted, an optical disk is detachably inserted into the game apparatus 12, which is an example of an information storage medium that is used interchangeably for the game apparatus 12 concerned. An information processing program (an application program typically like a game program) to be executed in the game apparatus 12 is stored in the optical disk. The game apparatus 12 performs information processing (game processing) by reading and executing the information processing program recorded in the optical disk.

The television 16 displays a game image obtained by the game processing performed in the game apparatus 12. The television 16 has a speaker 16a (FIG. 2), and the speaker 16a outputs a game sound obtained as a result of the above-described game processing.

In addition, in another embodiment, the game apparatus 12 and the stationary display may be integrated with each other. Moreover, communication between the game apparatus 12 and the television 16 may be wireless communication.

The terminal device 14 transmits or receives data to or from the game apparatus 12 at least. A user (player) can use the terminal device 14 while moving the terminal device 14 with his/her hand, or arranging the terminal device 14 at a free position. The terminal device 14 comprises an operation portion such as a touch panel 56, an analog stick 58 and an operation button 60, and a display portion such as an LCD 62. It is possible to perform communication with the game apparatus 12 by wireless communication using technology of Bluetooth (registered trademark), for example. However, the terminal device 14 and the game apparatus 12 may be connected with each other by a cable. The terminal device 14 receives from the game apparatus 12 data of an image (game image, for example) that is produced in the game apparatus 12, and displays the received image on the LCD 62. Moreover, the terminal device 14 transmits operation data representing content of an operation that is performed on its own machine to the game apparatus 12.

Figure 2:
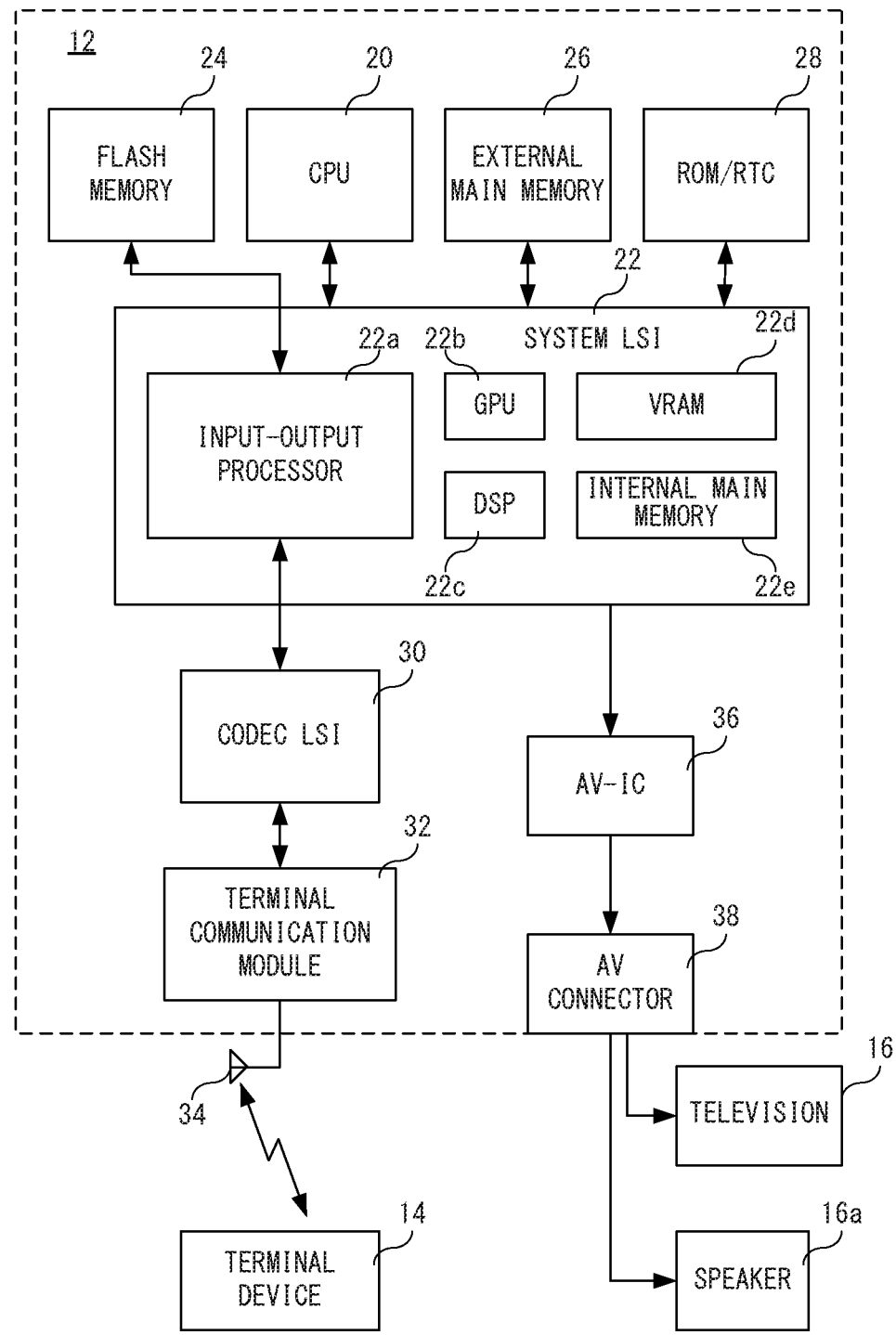
FIG. 2 is a block diagram showing a non-limiting example electric structure of a game apparatus shown in FIG. 1.

FIG. 2 is a block diagram showing non-limiting example electric structure of the game apparatus 12. The game apparatus 12 has a CPU 20, a system LSI 22, an external main memory 26, a ROM/RTC 28, an AV-IC 36, etc.

By executing the game program recorded in the optical disk, the CPU 20 performs the game processing, and functions as a game processor. The CPU 20 is connected to the system LSI 22. The external main memory 26, the ROM/RTC 28 and the AV-IC 36 are connected to this system LSI 22 in addition to the CPU 20. The system LSI 22 performs processing such as control of data transfer between respective components connected to the system LSI 22, producing an image to be displayed, acquiring data from an external information processing apparatus, and so on.

A volatile external main memory 26 is a memory for storing a game program read from the optical disk, a game program read from the flash memory 24 and various kinds of data, and used as a working area and a buffer area for the CPU 20. The ROM/RTC 28 has a ROM (so called a boot ROM) in which a program for starting the game apparatus 12 is incorporated, and a clock circuit (RTC) for counting time.

In addition, the program data, texture data, etc. read from the optical disk are written in an internal main memory 22e described later or the external main memory 26.

An input/output processor (I/O processor) 22a, GPU 22b, DSP 22c, VRAM 22d and the internal main memory 22e are provided in the system LSI 22. Although illustration is omitted, these components 22a-22e are connected to each other by an internal bus.

The GPU 22b forms a part of a drawing portion, and produces image data according to a graphics command (drawing instruction) from the CPU 20. However, data such as polygon data, texture data, etc. read from the main memory (22e, 26) are stored in the VRAM 22d, and the GPU 22b produces image data using the data. In this embodiment, the game apparatus 12 produces image data of the game image to be displayed on the television 16 (hereinafter, called "game image for television").

The DSP 22c functions as an audio processor, and produces sound data using sound data and sound wave form (tone) data stored in the internal main memory 22e and the external main memory 26. In addition, in this embodiment, the game apparatus 12 produces sound data of the game sound to be output from the speaker 16a of the television 16 (hereinafter, called "game sound for television").

As described above, data of image and sound to be output on the television 16 (including sound effect, music, etc.) out of the images and sounds produced in the game apparatus 12 are read by the AV-IC 36. The AV-IC 36 outputs, via an AV connector 38, the read image data to the television 16, and the read sound data to the speaker 16a that is incorporated in the television 16, whereby an image is displayed on the television 16 and a sound or voice is output from the speaker 16a.

The input/output processor 22a performs transmission and reception of data with the components connected to the same, or performs download of data from external information processing apparatus. Moreover, the input/output processor 22a is connected to the flash memory 24 and a codec LSI 30. Furthermore, the codec LSI 30 is connected to a terminal communication module 32, and an antenna 34 is connected to the terminal communication module 32.

By executing the game program, the CPU 20 reads data stored in the flash memory 24 so as to utilize by the game program. The flash memory 24 may store with save data (result data or intermediate data) of the game that is played using the game apparatus 12 in addition to data transmitted or received between the game apparatus 12 and external information processing apparatus.

In addition, although illustration is omitted, the input/output processor 22a can be connected to a network such as the Internet with using a network communication module so as to communicate (transmit and receive data) with the external information processing apparatus (other game apparatuses or various servers, etc., for example) connected to the network.

Moreover, the game apparatus 12 can transmit and receive data to and from the terminal device 14. When transmitting data to the terminal device 14, the input/output processor 22a outputs the data to be transmitted to the codec LSI 30. The codec LSI 30 performs predetermined compression processing to the data that is sent from the input/output processor 22a. The terminal communication module 32 performs wireless communication with the terminal device 14. Therefore, data compressed by the codec LSI 30 is transmitted to the terminal device 14 by the terminal communication module 32 via the antenna 34. In this embodiment, the codec LSI 30 compresses data with using highly efficient compression technology such as H264 standard, for example.

Moreover, the game apparatus 12 can receive (accept) various kinds of data from the terminal device 14. In this embodiment, the terminal device 14 transmits operation data, image data and sound data. Each data transmitted from the terminal device 14 is received by the terminal communication module 32 via the antenna 34. Here, the image data and the sound data from the terminal device 14 are subject to the same compression processing as the data that is transmitted from the game apparatus 12 to the terminal device 14.

Therefore, the image data and the sound data are sent to the codec LSI 30 from the terminal communication module 32, and subjected to extension processing by the codec LSI 30 to be output to the input/output processor 22*a*.

On the other hand, because the operation data from the terminal device 14 is little data amount compared with the image data and the sound data, there is no need to subject the compression processing to the operation data. Moreover, the operation data may be or may not be encrypted as necessary. The operation data is output to the input/output processor 22*a* via the codec LSI 30 after the same is received by the terminal communication module 32. The input/output processor 22*a* stores (temporarily stores) the data that is received from the terminal device 14 into the buffer area of the internal main memory 22*e* or the external main memory 26.

In addition, there is no necessity that the structure of the game apparatus 12 is limited. For example, it is also possible to have structure capable of connecting with expansion devices.

Figure 3:
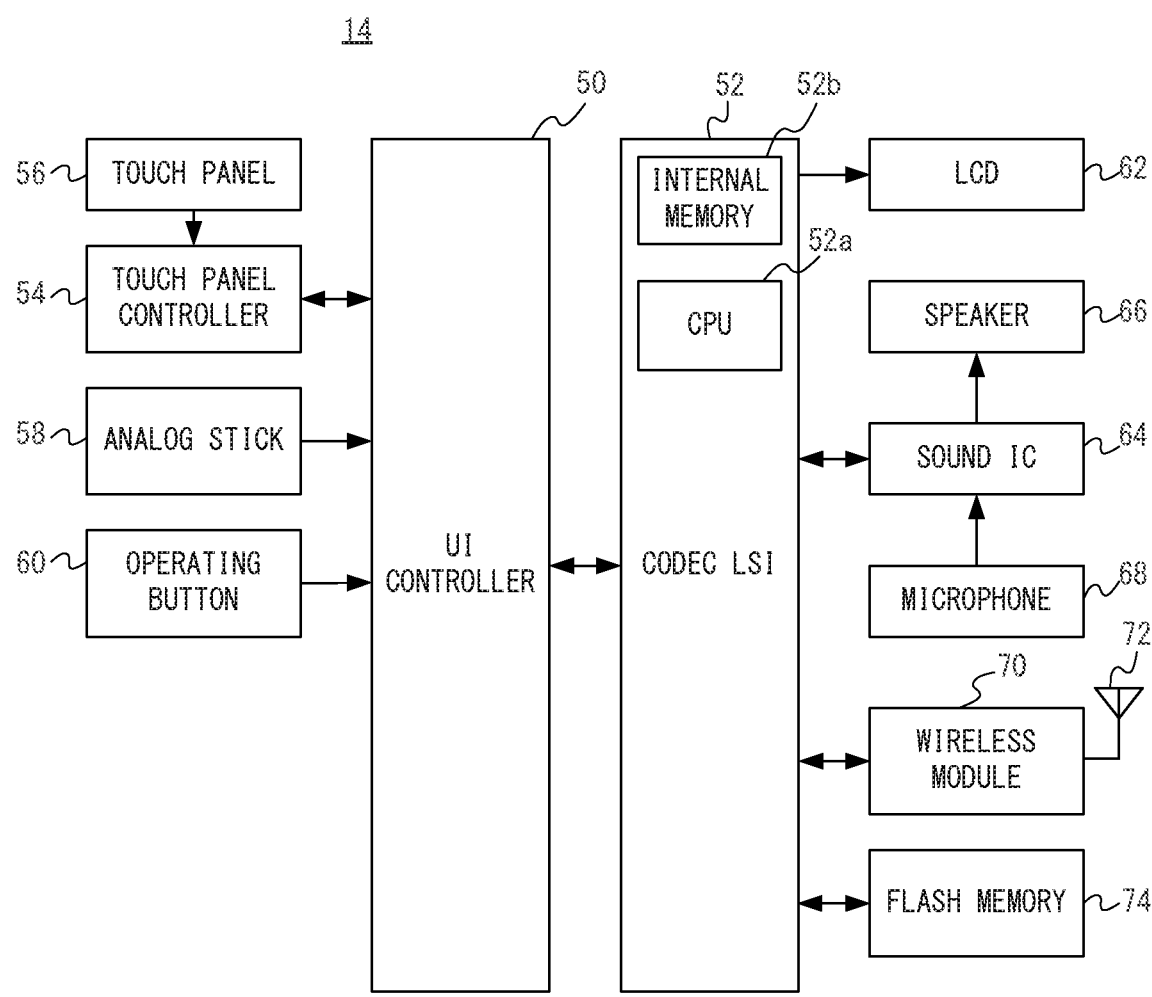
FIG. 3 is a block diagram showing a non-limiting example electric structure of a terminal device shown in FIG. 1.

FIG. 3 is a block diagram showing non-limiting example electric structure of the terminal device 14. As shown in FIG. 3, the terminal device 14 comprises, in addition to the structure shown in FIG. 1, a user interface controller (UI controller) 50, a touch panel controller 54, a codec LSI 52, a speaker 66, a sound IC 64, a microphone 68, a wireless module 70, an antenna 72 and a flash memory 74. These electronic components are mounted on an electronic circuit board, and accommodated within a housing.

The UI controller 50 is a circuit for controlling inputs and outputs of data to various kinds of input-and-output portions. This UI controller 50 is connected to the touch panel controller 54, the analog stick 58 and the operation button 60. Moreover, the UI controller 50 is connected to the codec LSI 52.

The touch panel controller 54 is a circuit that is connected to the touch panel 56 to control the touch panel 56. The touch panel controller 54 produces touch position data of a predetermined format based on a signal from the touch panel 56, and outputs the touch position data to the UI controller 50. The touch position data represents coordinates of a position (touch position) at which an input is performed on an input face of the touch panel 56.

The analog stick 58 outputs to the UI controller 50 stick data representing a direction and amount that a stick portion operated by a finger of the user is slid (inclined). Moreover, the operation button 60 outputs to the UI controller 50 operation button data representing an input situation (depressed or not) to various kinds of operation buttons or key switches.

The UI controller 50 outputs to the codec LSI 52 operation data that includes the touch position data, the stick data and the operation button data received from the above-described respective components.

The codec LSI 52 is a circuit that performs compression processing to data to be transmitted to the game apparatus 12, and extension processing to data transmitted from the game apparatus 12. The LCD 62, the sound IC 64, the wireless module 70 and the flash memory 74 are connected to the codec LSI 52. Moreover, the codec LSI 52 includes a CPU 52*a* and an internal memory 52*b*.

The antenna 72 is connected to the wireless module 70, and the wireless module 70 transmits transmission data to the game apparatus 12 via the antenna 72. The wireless module 70 has the same function as the terminal communication module 32 of the game apparatus 12. As described above, the operation data, the image data and the sound data are included in the transmission data to be transmitted to the game apparatus 12 from the terminal device 14.

In addition, although the terminal device 14 of this embodiment is provided with an operation portions such as the touch panel 56, the analog stick 58 and the operation button 60, in another embodiment, it may be structure having another operation portion instead of these operation portions or together with these operation portions. For example, at least one of a magnetic sensor, an acceleration sensor and a gyro sensor may be provided as a sensor for calculating a motion (including a position and/or attitude or a change in position and/or attitude) of the terminal device 14.

Moreover, although the terminal device 14 is configured to have a camera and the microphone 68, in another embodiment, the terminal device 14 does not need to have the camera and the microphone 68, or may have one of them only.

The game apparatus 12 that is an example of information processing apparatus also functions also as an image processing apparatus, and produces and outputs (displays) image data. Briefly describing, the GPU 22*b* performs modeling of various kinds of objects in a three-dimensional virtual space under instructions of the CPU 20. That is, various kinds of objects are produced or arranged in the virtual space, whereby a certain sight (scene) can be produced. An image that this scene is imaged by the virtual camera (viewed from a viewpoint) is displayed on the television 16 (monitor). Describing specific image processing, a scene is first produced in the three-dimensional virtual space (world coordinate system), and the scene produced in the virtual space is converted (perspective transformation) into a coordinate system captured from the virtual camera (camera coordinate system). For example, an image viewed from the viewpoint is perspective-projected on a virtual screen. Next, clipping and hidden-surface-removal processing are performed. Subsequently, by applying shading, brightness (shade) of an object surface is expressed. Furthermore, by applying shadowing, a shadow caused by the object is expressed. Then, texture mapping is performed. A two-dimensional image is thus produced (drawn) and two-dimensional image data corresponding to the produced two-dimensional image is output to the television 16 via the AV-IC 36 and the AV connector 38. Producing two-dimensional image data from three-dimensional data is called rendering.

FIG. 4 shows a non-limiting example game screen 100 of a virtual game of this embodiment. In this game screen 100, a character object (player object 102) and a terrain object 104 are included. Although omitted in FIG. 4, in the game screen 100 (virtual space), other character objects such as an enemy object and item objects are also included.

The player object 102 performs, according to an operation of a player, arbitrary actions such as changing a direction in the virtual space, moving in the virtual space, using an item like arms and so on. Therefore, for example, the player object 102 may fight with an enemy object, and may acquire an item object. Moreover, an enemy object is a non-player object, and the non-player object performs, according to control of a computer (CPU 20) irrespective of an operation of the player, arbitrary actions such as moving in the virtual space, etc. The terrain object 104 is called also a background object etc., and an object of terrain arranged in the virtual space. In this embodiment, the terrain means flat ground, uneven ground, hill (slope), floor, tree, grass, flower, building, stairway, cave, cliff, wall (step difference), etc.

As described above, the virtual space of this embodiment is a three-dimensional virtual space, and a world coordinate system is set to this virtual space. For example, a two-dimensional plane (horizontal plane) and a position in a horizontal direction in the virtual space are expressed by an X-axis and a Y-axis of the world coordinate system, and a position in a height direction in the virtual space is expressed by a Z-axis of the world coordinate system.

In such a game apparatus 12, an animation when the player object 102 moves is changed according to terrain, or an action is selected according to terrain around the player object 102.

For example, since an animation when the player object 102 moves (runs, walks, etc.) on the flat ground, an animation when the player object 102 goes up a hill and an animation when the player object 102 goes down a hill are different from each other, it needs to appropriately select an animation according to terrain and display the player object 102.

For example, when moving on the flat ground, the player object 102 walks upright or runs with a slight forward tilted posture. Moreover, when going up a hill, the player object 102 walks with a forward tilted posture or runs with a forward tilted posture, and an angle of the forward tilted posture is changed according to a gradient of the hill. Furthermore, when going down a hill, the player object 102 walks with a backward tilted posture or runs with a backward tilted posture, or when a gradient of the hill is large, the player object 102 slides down or goes down while gripping the ground (slope) of the hill. Furthermore, when moving up or down along a wall, a cliff or a tree, the player object 102 gets climbing up or down with gripping a wall side, a cliff side or the tree.

Moreover, when the player object 102 goes up a hill or goes down a hill, it is necessary to change a movement speed of the player object 102 according to a gradient (size of inclination) of the hill. Moreover, when terrain is changed from a hill to the relatively flat ground (horizontal plane), it is necessary to appropriately change an animation before and after the change.

Furthermore, when there is a cliff or wall looked up by the player object 102 in a traveling direction of the player object 102, a graphical user interface (GUI) for allowing the player to select whether to go up the cliff or wall must be displayed. This is also the same in a case where there is a tree in front of the player object 102. Furthermore, when there is a cliff or wall looked down by the player object 102 in a traveling direction of the player object 102, a GUI for allowing the player to select whether to go down the cliff or wall must be displayed.

In a general game apparatus 12, a control code including an action code indicating an action to be performed by the player object 102, a type code indicating a type of a terrain polygon, etc. are stored in advance corresponding to a polygon constituting the terrain object 104, and by referring to the stored control code, an animation of the player object 102 is changed or a GUI for allowing the player object 102 to select going up or going down the cliff or wall (action of the player object 102) is displayed.

However, when storing the above-described control code corresponding to a polygon that constitutes a terrain object 104, a storing work is troublesome, and if a game field (map) produced in a virtual space is comparatively large, it requires a lot of labor and a work cost. Moreover, a memory capacity becomes huge. Moreover, in such a case, there is a problem that it cannot deal with moving terrain. For example, when a large tree is standing, it can be determined that there is a wall in the traveling direction of the player object 102; however, when this tree collapses, it is impossible to determine that there is no wall in the traveling direction of the player object 102.

Then, in this embodiment, terrain in the traveling direction of the player object 102 is determined according to a predetermined algorithm. That is, an inclination and a height of the ground in the traveling direction of the player object 102 are calculated. Moreover, in the traveling direction of the player object 102, presence or absence of a cliff (wall) looked down by the player object 102 is determined.

In this specification, when a comparatively low wall or step (step difference) that the player object 102 can climb over exists in front of the player object 102, or when there is a cliff, wall or tree looked up by the player object 102, it will be described simply that there is a wall in front (traveling direction) of the player object 102. Moreover, when a cliff or wall looked down from the player object 102 exists (is arranged) in front of the player object 102, it will be described simply that there is a cliff in front (traveling direction) of the player object 102.

Moreover, in this specification, the traveling direction means a direction that the player object 102 is moving, a direction that the player object 102 or a face of the player object 102 is turned to when the player object 102 is stopping, or a direction that the player object 102 should move due to restrictions of the game, etc.

However, as described later, when determining terrain, there is a case where a traveling direction is estimated based on a position where a determination object 120 collides with the terrain object 104.

For example, a method of determining terrain when the player object 102 moves on the slightly undulating ground will be described with reference to FIG. 5-FIG. 7. Although described specifically in the following, an object 120 for determining terrain (hereinafter, called "determination object 120") has a sphere shape in a three-dimensional virtual space. However, since each of FIG. 5-FIG. 7 (the same can be also applied to other drawings) is a view that the player object 102 is viewed from a right side direction, the determination object 120 is indicated by a circle.

In this embodiment, the determination object 120 is cast or thrown the predetermined number of times except for cliff side determination processing and expanded cliff side determination processing both described later. Hereinafter, to calculate the collision position when the determination object 120 is moved in order to determine terrain is referred to as "cast (ing)". Moreover, a start position when casting the determination object 120 differs at every time. Furthermore, although the determination object 120 is cast toward a target position from a start position, a target position of a first time is fixedly decided with respect to a start position of a first time, and a target position of a second and subsequent time is decided basically based on at least a collision position of the last time.

Figure 5A:
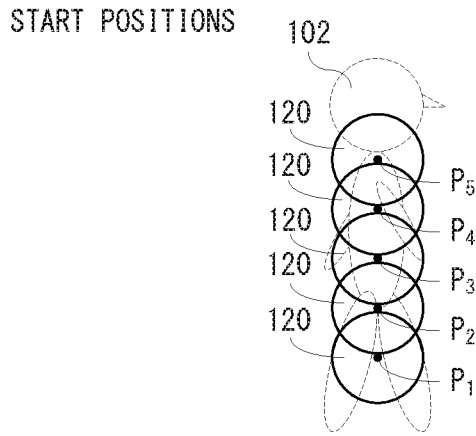
FIG. 5A is an illustration view showing a start position for a determination object that is set to a player object.

FIG. 5A shows a start position $P_m$ (m=1, 2, 3, 4, 5) for the determination object 120 that is set to the player object 102. It should be noted that a variable m indicates the number of times and an order of casting the determination object 120.

As described above, each of the start positions $P_1$-$P_5$ is relatively set in advance from a position (foot position, for example) of the player object 102. For example, according to a stature of the player object 102, a size of the determination object 120 and a total number of times that the determination object 120 is cast, the start positions $P_1$-$P_5$ are set in an order that the player object 102 goes from a bottom toward a top.

In this embodiment, the stature of the player object 102 in the virtual space is set as 180 cm, a diameter of the determination object 120 is set to about a size of a waist of the player object 102 (diameter is 60 cm), the total number of times of casting the determination object 120 is set as 5 (five) times, and a start position $P_1$ of a first time is set at a position about 40 cm high from a position of the foot (back of the foot) of the player object 102. Other start positions $P_2$-$P_5$ are set so as to be moved upward by a radius of the determination object 120 from the start position $P_1$ of the first time. However, a position that each of the start positions $P_1$-$P_5$ is set is an example, and it does not need to be limited.

A reason why the start positions $P_1$-$P_5$ are thus set is that it is necessary, in this embodiment, to move or shift the determination object 120 is moved at each time so as to gradually move away from the position near the feet of the player object 102 toward the traveling direction.

In the following drawings, the start position for the determination object 120 is the center of a circle shown by $P_m$, and the target position for the determination object 120 is a center of the circle shown by $Q_m$, and a position of the determination object 120 in case that the determination object 120 collides with (surface of) the terrain object 104 is the center of a circle shown by $R_m$. However, a position that the determination object 120 collides with the terrain object 104 (hereinafter, called a "collision position") is a position (point) that an outer circumferential surface of the determination object 120 and a surface (here, the ground) of the terrain object 104 contact to each other, and is indicated by $C_m$. Moreover, in examples shown in FIG. 5B-FIG. 7B, for simplicity, a case where the determination object 120 is cast 3 (three) times.

Figure 5B:
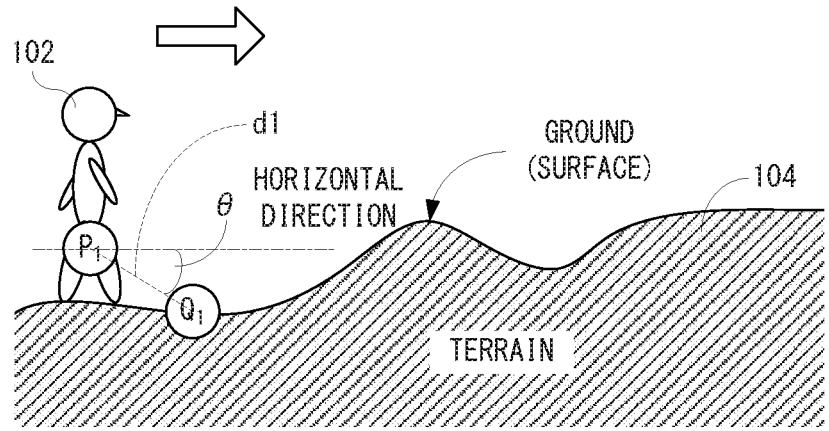
FIG. 5B is an illustration view showing a non-limiting decision method of a first time target position for the determination object.
Figure 5C:
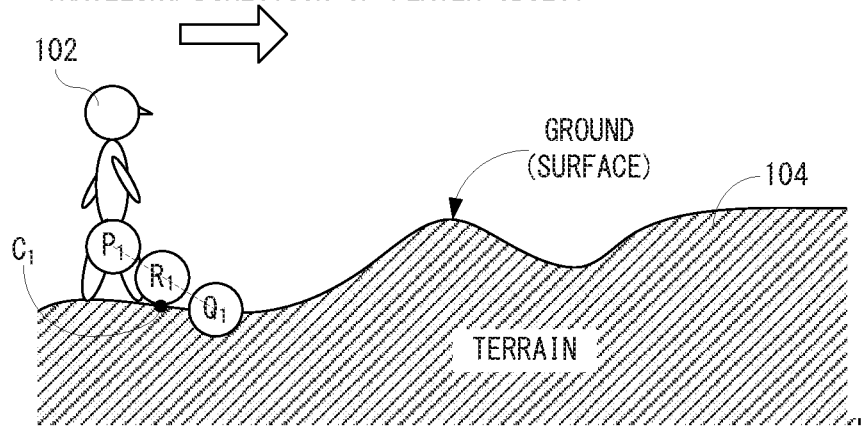
FIG. 5C is an illustration view showing a first time collision position of the determination object.

As shown in FIG. 5B, at a first time, a target position (end position) $Q_1$ is decided with respect to a start position $P_1$ that is decided in advance for the player object 102, and the determination object 120 is cast (moved) toward the target position $Q_1$ from the start position $P_1$. However, it is unnecessary to actually move the determination object 120, and if it is determined that the determination object 120 collides, thereafter, it does not need to perform calculation for moving the determination object 120 to the target position $Q_m$.

At the first time, the target position $Q_1$ is set according to a predetermined rule (a first rule) with respect to the start position $P_1$. Specifically, the first time target position $Q_1$ is set to a position that is shifted from the start position $P_1$ by a predetermined distance d1 downward by a predetermined angle θ (theta) from the traveling direction of the player object 102. In this embodiment, the predetermined angle θ (theta) and the predetermined distance d1 are decided in advance based on a simulation (experiment) result etc.

In case of moving or casting the determination object 120 to the target position $Q_1$ from the start position $P_1$, it is determined whether the determination object 120 collides with (surface of) the terrain object 104. If it is determined that the determination object 120 collides with the terrain object 104, a three-dimensional coordinate of a collision position $C_1$ shown in FIG. 5B and its related information will be stored in the memory (22e, 26). Hereinafter, the same is true in case that the determination object 120 collides with the terrain object 104.

However, whether the determination object 120 collides with the terrain object 104 is determined by determining whether a shape (polygon) of the determination object 120 is contact with a shape (polygon) of the terrain object 104.

Moreover, the related information is a normal vector of the polygon constituting the terrain object 104 at the collision position $C_1$ (other collision positions $C_m$ are the same), and surface information of the polygon. The surface information is set as needed, and is information on whether to prohibit the player object 102 from gripping the surface of the terrain object 104, for example. Depending on the content of the game, there is a case where it is desired to make the player object 102 not grip the surface of the terrain object 104 due to the progress of the game. For example, when the player object 102 moves on a gentle slope, it is unnatural that the player object 102 is displayed with an animation that the player object 102 goes up with gripping the slope, so there is a case where it is desirable to avoid such animation. Moreover, there is a case where it is desired simply to make the player object 102 not grip the surface of the terrain object 104. Accordingly, by setting the surface information, it is possible to avoid an animation that it is desired to avoid according to the game effect.

If the memory (22e, 26) is stored with the three-dimensional coordinate of the collision position $C_1$ and its related information, a second target position $Q_2$ of a second time for the determination object 120 is decided according to a predetermined rule (a second rule different from the first rule) based on this collision position $C_1$. That is, in this embodiment, a target position $Q_m$ of a second and subsequent time for the determination object 120 is decided based on the collision position $C_{m-1}$ of the last time.

However, as described in detail later, in case that the determination object 120 does not collide with the terrain object 104, in order to determine whether a wall (step difference) of about a stature (height) of the player object 102 exists in the traveling direction of the player object 102, a target position $Q_m$ is decided according to a predetermined rule (a third rule). Otherwise, in case that the determination object 120 does not collide with the terrain object 104, in order to determine whether determination processing for determining whether a cliff exists in the traveling direction of the player object 102 is to be performed, a target position $Q_m$ is decided according to a predetermined rule (a fourth rule).

Figure 6A:
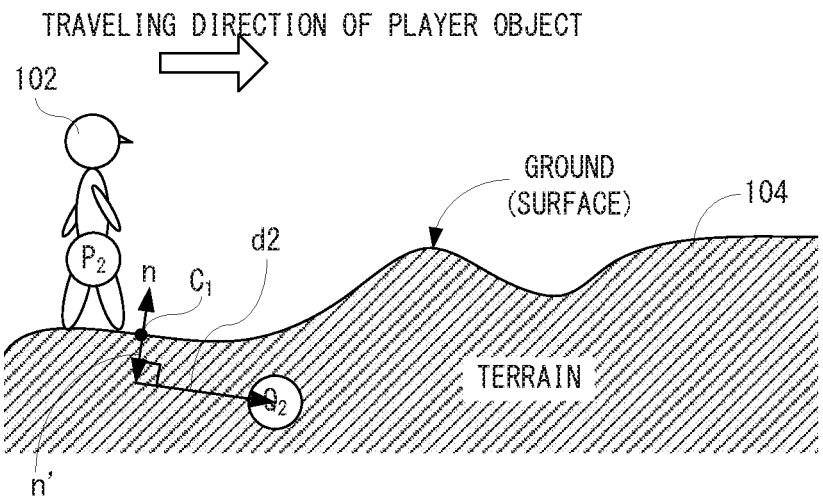
FIG. 6A is an illustration view showing a non-limiting decision method of a second time target position.

As shown in FIG. 6A, when deciding a target position $Q_2$ of a second time for the determination object 120, a normal vector n of the ground extending from the collision position $C_1$ is acquired first. The normal vector n is previously stored in association with the polygon constituting the terrain object 104 in advance, and a normal vector n corresponding to a polygon including the collision position $C_1$ is acquired. In addition, a normal vector n can also be calculated as a direction orthogonally intersecting a polygon. When storing in advance, it is also possible to dare to store a direction not orthogonally intersecting a polygon as a normal vector.

In addition, in order to intelligibly show the normal vector n and a vector n' opposite to the normal vector n (hereinafter, referred to as "reverse vector"), a length (size) of each vector is indicated with a length about the diameter of the determination object 120 in the drawings; however, in fact, the normal vector n is a unit vector whose magnitude is 1 (one). However, a size of the normal vector n is a size in the virtual space.

Next, the reverse vector n' is calculated, and a position that is shifted from an end of the reverse vector n' by a predetermined distance d2 in a direction that is perpendicular to the reverse vector n' and toward the traveling direction of the player object 102 is decided as a next target position $Q_2$. The predetermined distance d2 is also a value that is experientially decided by a simulation etc., like the predetermined distance d1.

Figure 6B:
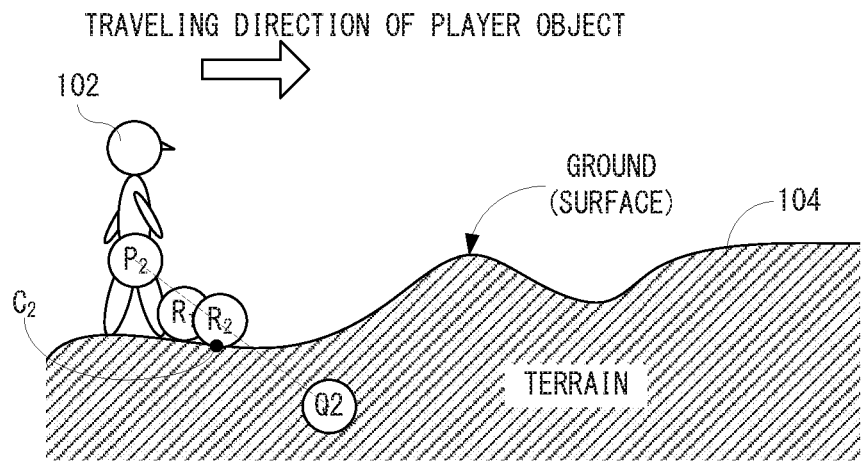
FIG. 6B is an illustration view showing a second time collision position.

When the next target position $Q_2$ is decided, the determination object 120 is cast toward the target position $Q_2$ from the start position $P_2$ of the second time. As shown in FIG. 6B, the determination object 120 collides with the terrain object 104 (ground) at a position $R_2$. As described above, a next target position $Q_3$ is decided based on this collision position $C_2$.

Figure 7A:
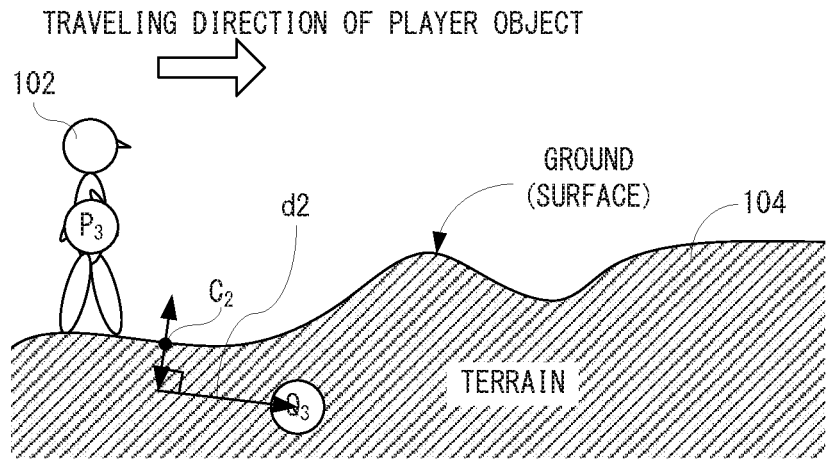
FIG. 7A is an illustration view showing a non-limiting decision method of a third time target position.

As shown in FIG. 7A, in deciding a target position $Q_3$ of a third time for the determination object 120, a reverse vector n' in a direction opposite to the normal vector n of the ground extending from the collision position $C_2$ that is acquired as the related information is calculated. Then, a position that is shifted from an end of the reverse vector n' by the predetermined distance d2 in a direction that is perpendicular to the reverse vector n' and toward the traveling direction of the player object 102 is decided as a next target position $Q_3$.

However, when deciding a target position $Q_m$ of a third and subsequent time, as described later, except a case where the determination object 120 is moved from an additional start position $P_m$ toward an additional target position $Q_m$, the traveling direction that is estimated from the one before last collision position $C_{m-2}$ and the last collision position $C_{m-1}$. Specifically, the estimated traveling direction is a direction indicated by a vector that the one before last collision position $C_{m-2}$ (here, collision position $C_1$) is a start point and the last collision position $C_{m-1}$ (here, collision position $C_2$) is an end point.

A reason why the traveling direction that is thus estimated is used is that the traveling direction at the current position of the player object 102 and the traveling direction when the player object 102 advances may change according to a change in the terrain.

Figure 7B:
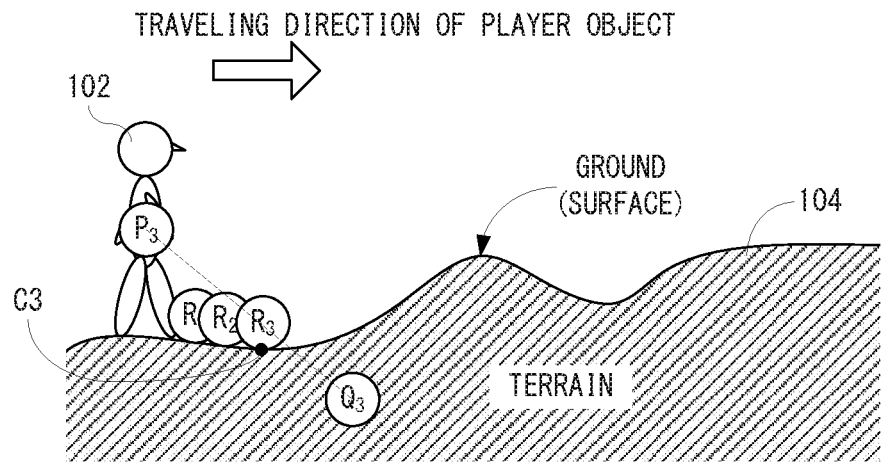
FIG. 7B is an illustration view showing a third time collision position.

When the next target position $Q_3$ is decided, the determination object 120 is cast toward the target position $Q_3$ from the start position $P_3$ of the third time. As shown in FIG. 7B, the determination object 120 collides with the terrain object 104 (ground) at a position $R_3$.

Although omitting illustration and description, for a fourth and five times as well, target positions $Q_4$ and $Q_5$ are similarly decided based on last collision positions $C_3$ and $C_4$, and the determination object 120 is cast from each of start positions $P_4$ and $P_5$, and collision positions $C_4$ and $C_5$ are obtained.

Figure 8:
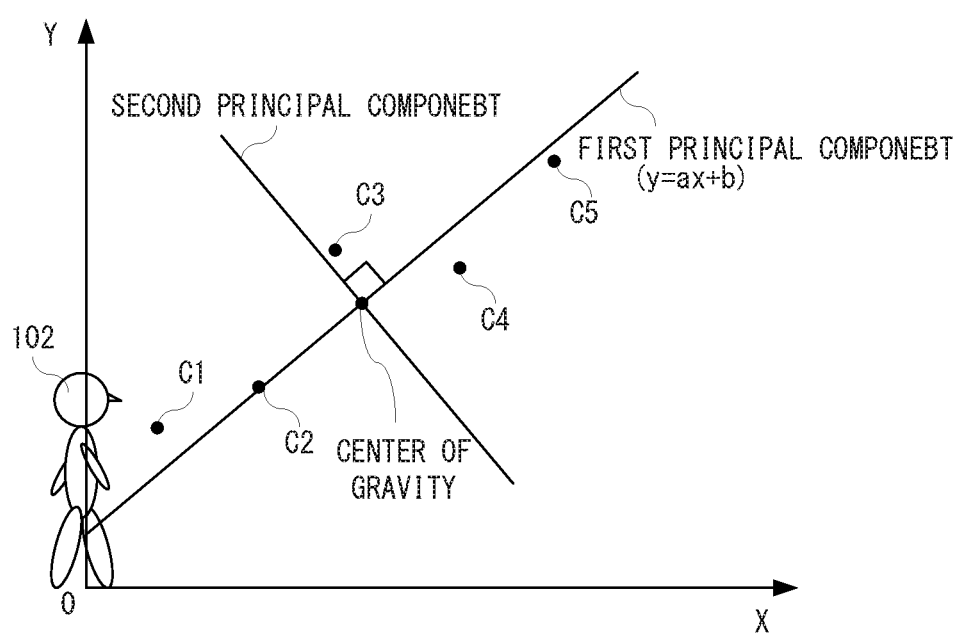
FIG. 8 is an illustration view showing an example of a result of a principal component analysis while projecting a collision position on a virtual two-dimensional plane set in the traveling direction of the player object.

If the determination object 120 is cast the predetermined number of times, based on all the detected collision positions ($C_1$, $C_2$, $C_3$, $C_4$, $C_5$), the inclination and the height of the ground in the traveling direction of the player object 102 can be calculated. In this embodiment, as shown in FIG. 8, assuming that there is a two-dimensional plane that an axis extending in the traveling direction of the player object 102 is an X-axis and an axis extended toward the above of the player object 102 is a Y-axis, all the detected collision positions ($C_1$, $C_2$, $C_3$, $C_4$, $C_5$) are projected (plotted) onto this two-dimensional plane. The inclination (angle) of the ground is calculated from these plotted two-dimensional point information.

In this embodiment, a principal component analysis in an X component and a Y component of the plotted points (collision positions) are evaluated. In addition, the principal component analysis is originally a method for replacing multivariate data with lower dimensional information, thereby to interpret data so as to become a new index. In order to evaluate a principal component, it may decide a linear line that passes through the center of gravity G of a plurality of plotted points and that makes minimum a square sum of distances from each point to this linear line. If a first principal component and a second principal component are obtained as a result of the principal component analysis, as for each of the plotted points, an index of a principal component score (Px, Py) can be obtained. When the first principal component is set as a horizontal axis, the second principal component is set as a vertical axis, and a point that the axis of the first principal component and the axis of the second principal component intersect is set an origin point, this principal component score (Px, Py) represents each of the points being projected on the above-described two-dimensional plane with the axis of the first principal component and the axis of the second principal component as a reference.

Moreover, it is known that the inclination a for each of the two-dimensional points is acquirable when performing the principal component analysis on the data of the points. Mathematically, principal component analysis results are obtained by performing eigenvalue decomposition on a variance-covariance matrix. The inclination a is an inclination of a primary function (y=ax+b) calculated by the principal component analysis, and as shown by Equation 1, can be evaluated as a ratio of respective principal component scores. Here, a range of the inclination a is −1 or more and 1 or less ($-1 \le a \le 1$).

$$\text{inclination } a = Px/Py \qquad \text{[Equation 1]}$$

As understood from Equation 1, when the principal component score Py is 0 (zero), the inclination a cannot be calculated because divergence occurs. In this case, since only the principal component score Px is high, it is possible to determine that the inclination a is near horizontal. Inversely, when the principal component score Px is near 0 (zero) and only the principal component score Py is high, it is possible to determine that the inclination a is near vertical.

For example, if the inclination a is less than 0.2, it is determined that terrain is the flat ground. Moreover, if the inclination a is 0.3 or more and less than 0.5, it is determined that terrain is a gentle uphill. Furthermore, if the inclination a is 0.5 or more 0.5 and less than 0.8, it is determined that terrain is a steep uphill. Moreover, if the inclination a is 0.8 or more, it is determined that terrain is a wall. However, when the inclination a indicates a negative value, it is determined that terrain is a downhill or that terrain is a wall or cave slanting toward the player object 102.

In addition, when it is determined that there is a cliff in the traveling direction of the player object 102 to be described later, if the inclination a is a positive numeral value, it is determined that a cliff side is eroded at a side of the player object 102, and if the inclination a is a negative numeral value, it is determined that terrain is a shape close to a precipitous cliff or a steep downhill.

Moreover, a point that a linear line passing through the center of gravity G of a plurality of points plotted by the inclination a intersects the Y-axis is an intercept b. The intercept b indicates a height of the ground with respect to the player object 102. However, in fact, since the collision position $C_m$ is stored, it is possible to know the height of the ground by the Z coordinate of the collision position $C_m$.

Thus, from the principal component analysis, an average inclination (angle) at the time of expressing the ground (surface of the terrain object 104) with a single slope can be evaluated. However, since what calculated by the principal component analysis is a linear line, for example, when evaluating an extremely long distribution profile, it may be considerably different from an actual inclination (angle). Therefore, a method according to this embodiment should be applied to a short section (within a predetermined range from the position of the player object 102) of about several meters in the virtual space. The number of times of casting the determination object 120, the predetermined distance d1 and the predetermined distance d2 are set so that such a condition can be satisfied.

Moreover, the second principal component can be used to determine how much the evaluated inclination a can be considered to be "linear line". By this second principal component, it is possible to know dispersion with respect to the inclination a, that is, a degree of unevenness of the ground.

Figure 9A:
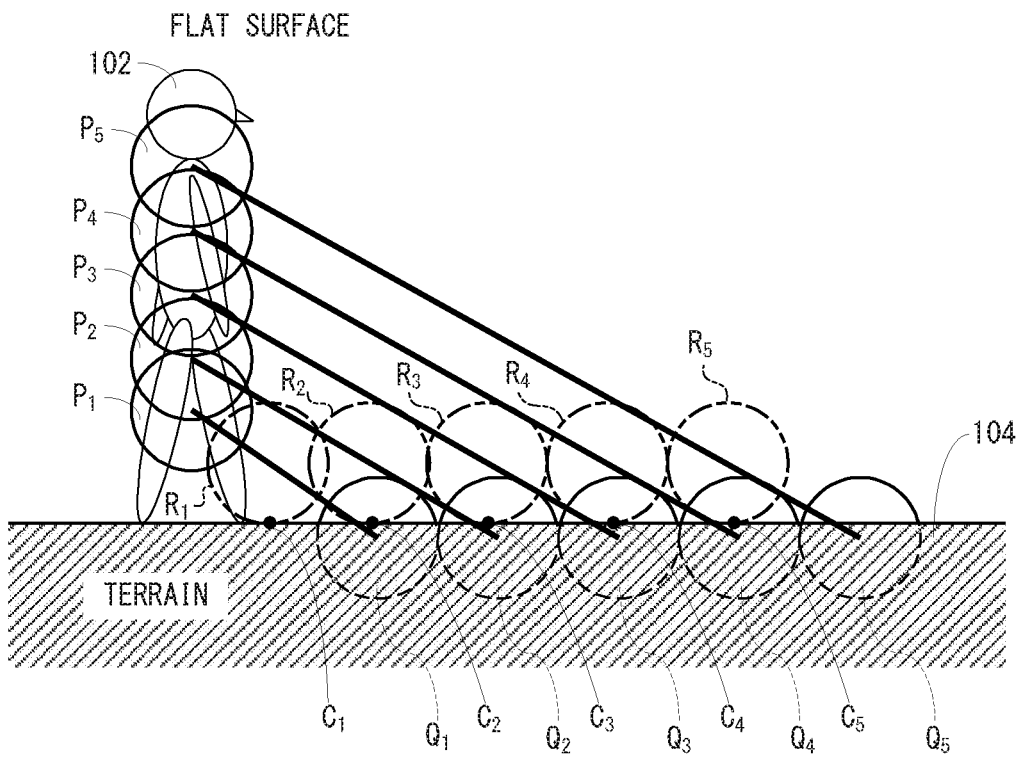
FIG. 9A is an illustration view showing a non-limiting determination method when determining terrain of a flat surface.
Figure 9B:
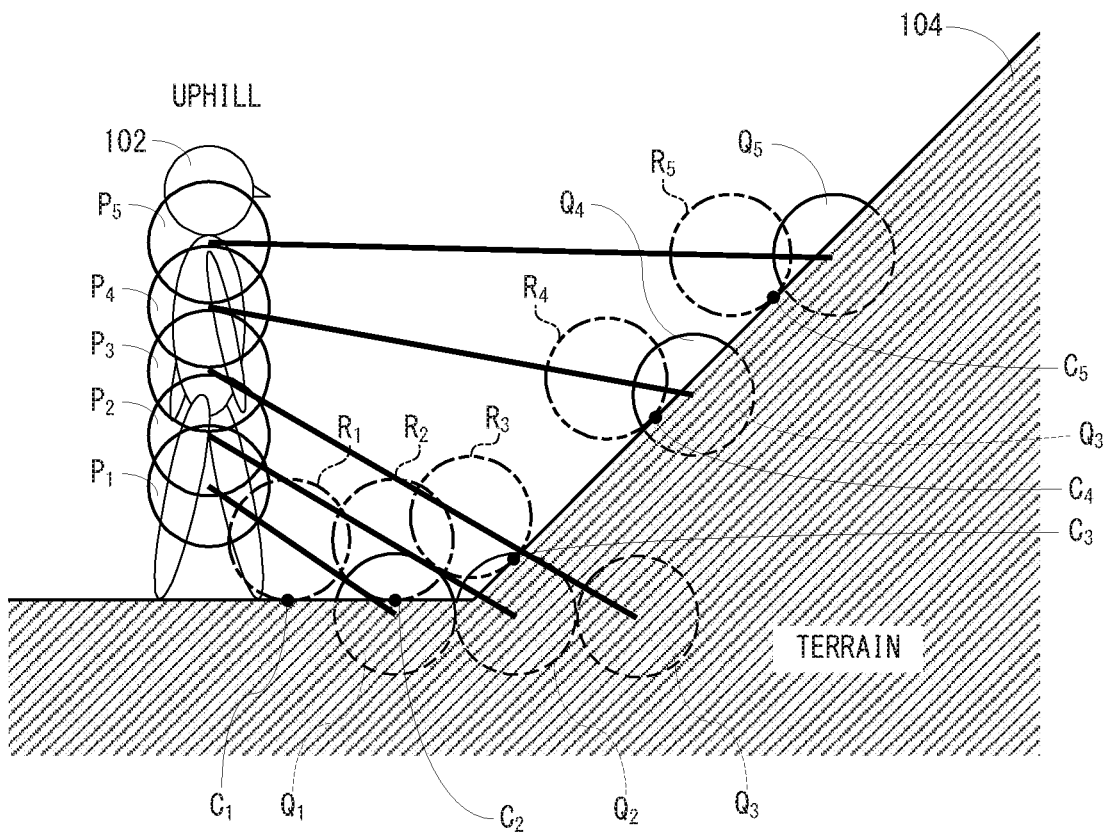
FIG. 9B is an illustration view showing a non-limiting determination method when determining terrain of an uphill slope.
Figure 10:
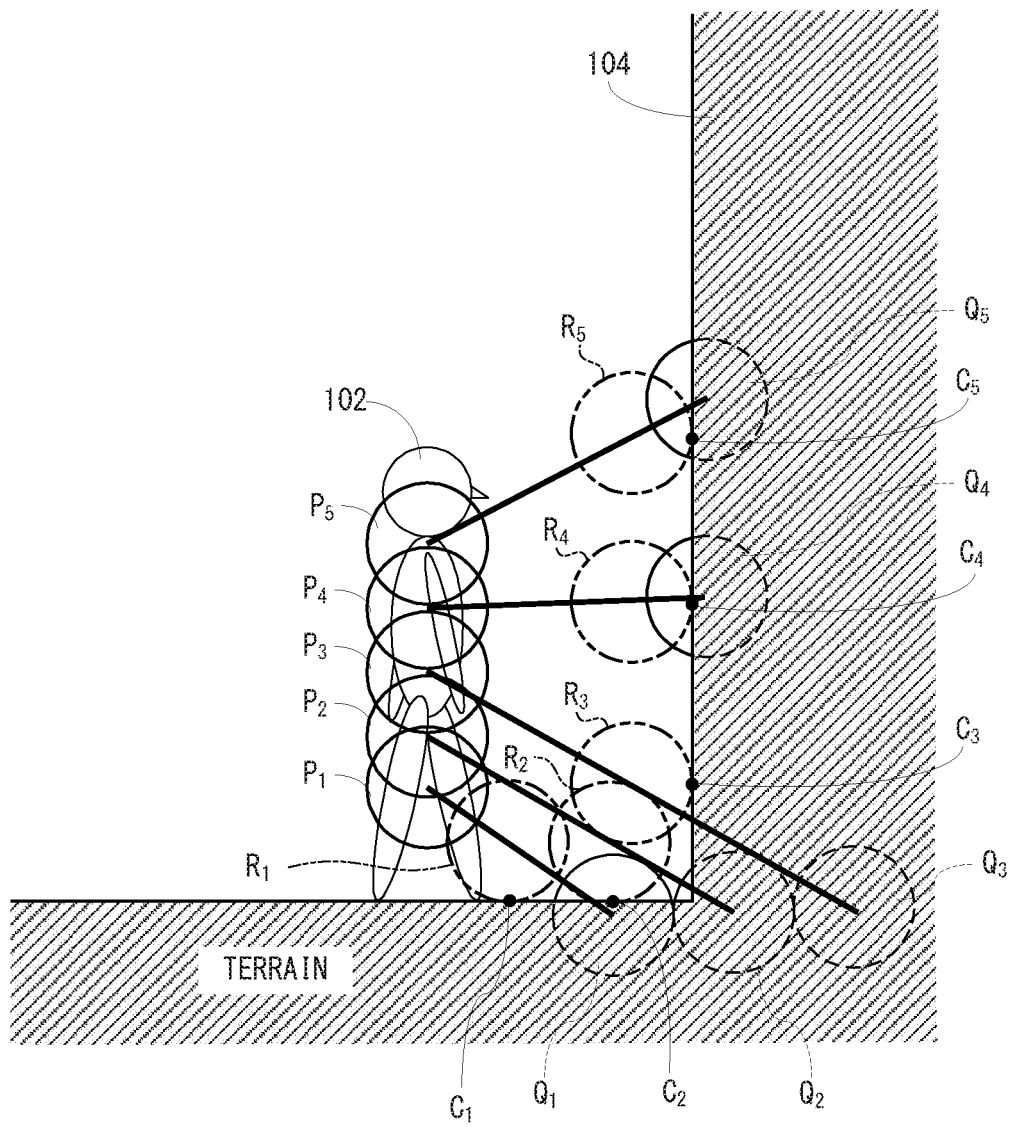
FIG. 10 is an illustration view showing a non-limiting determination method when determining terrain of a high wall standing vertically.
Figure 11:
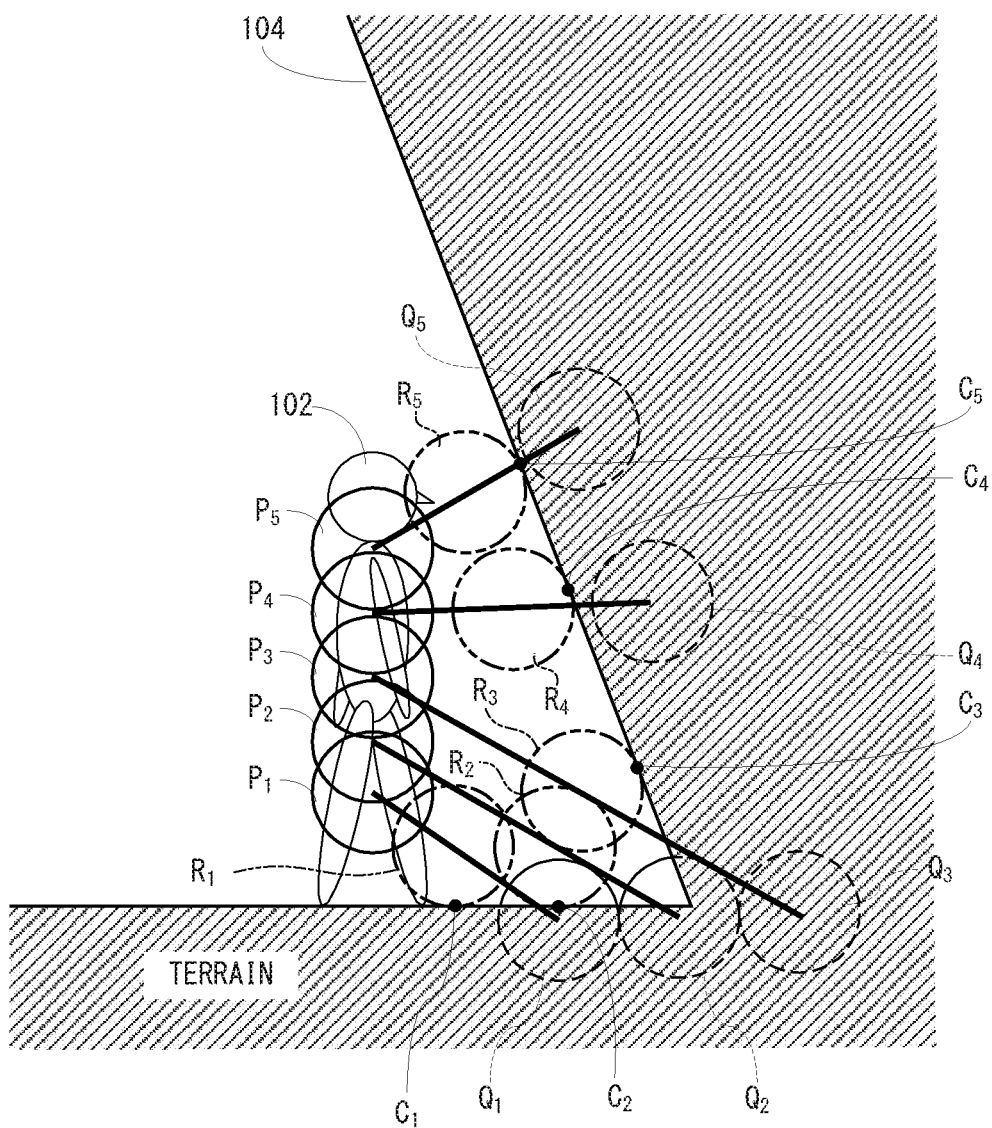
FIG. 11 is an illustration view showing a non-limiting determination method when determining terrain of a high wall inclined toward a side of a player object.

FIG. 9A is an illustration view for explaining setting of the target positions $Q_m$ and the collision positions $C_m$ of the determination object 120 when terrain with a flat surface is determined, and FIG. 9B is an illustration view for explaining setting of the target positions $Q_m$ and the collision positions $C_m$ of the determination object 120 when a comparatively steep uphill is determined. Moreover, FIG. 10 is an illustration view for explaining setting of the target positions $Q_m$ and the collision positions $C_m$ of the determination object 120 when it is determined that there is a vertical wall in the traveling direction of the player object 102. Furthermore, FIG. 11 is an illustration view for explaining setting of the target positions $Q_m$ and the collision positions $C_m$ of the determination object 120 when it is determined that there is a wall slanting to a side of the player object 102 in the traveling direction of the player object 102.

Since the collision positions $C_m$ are located in a line along the flat ground when the player object 102 exists on the flat ground as shown in FIG. 9A, the target positions $Q_m$ are also located in a line along the ground. However, as described above, the target position $Q_1$ of the first time is decided obliquely downward in the traveling direction of the player object 102 according to the first rule, and in the second and subsequent time, the target position $Q_{m+1}$ is set based on the reverse vector n' of the normal vector n at the collision position $C_m$ according to the second rule, and therefore, the target position $Q_m$ is set at a position buried in the ground. This is true in FIG. 9B.

When the player object 102 exists on the flat ground but there is an uphill slope in a forward direction as shown in FIG. 9B, the collision positions $C_m$ are located in line along a flat plane in a place near the player object 102 and if separating from the player object 102, the collision positions $C_m$ are located in line along the slope. Since the collision positions $C_1$ and $C_2$ are on the flat ground surface, the target positions $Q_2$ and $Q_3$ are set so as to be along this ground. Since the collision positions $C_3$ and $C_4$ are on the slope surface, the target positions $Q_4$ and $Q_5$ are set so as to be along this slope.

As described above, when deciding the target positions $Q_3$-$Q_5$ of the third and subsequent times, a direction indicated by a vector that the one before last collision position $C_{m-2}$ is a start point and the last collision position $C_{m-1}$ is an end point is estimated as the traveling direction. Therefore, as shown in FIG. 9B, the target positions $Q_3$-$Q_5$ are decided so as to move diagonally upward along the uphill slope as viewed from the player object 102.

When the player object 102 exists on the flat ground but there is a wall looked up by the player object 102 in a forward direction as shown in FIG. 10, the collision positions $C_m$ are located in line along a flat plane in a place near the player object 102 and if separating from the player object 102, the collision positions $C_m$ are located in line along a cliff side (wall side). Since the collision positions $C_1$ and $C_2$ are on the flat ground surface, the target positions $Q_2$ and $Q_3$ are set so as to be along this ground. Since the collision positions $C_3$ and $C_4$ are on the cliff side (wall side), the target positions $Q_4$ and $Q_5$ are set so as to be along this side (wall side).

As described above, when deciding target positions $Q_3$-$Q_5$ of the third and subsequent times, a direction indicated by a vector that the one before last collision position $C_{m-2}$ is a start point and the last collision position $C_{m-1}$ is an end point is estimated as the traveling direction. Therefore, as shown in FIG. 10, the target positions $Q_4$ and $Q_5$ are decided so as to move diagonally upward along the vertical wall as viewed from the player object 102.

When the player object 102 exists on the flat ground surface but there is a cliff (wall) that is looked up by the player object 102 and slants toward the player object 102 in a forward direction as shown in FIG. 11, the collision positions $C_m$ are located in line along a flat plane in a place near the player object 102 and if separating from the player object 102, the collision positions $C_m$ are located in line along a cliff side (wall side). Since the collision positions $C_1$ and $C_2$ are on the flat ground surface, the target positions $Q_2$ and $Q_3$ are set so as to be along this ground. Since the collision positions $C_3$ and $C_4$ are on the cliff side (wall side), the target positions $Q_4$ and $Q_5$ are set so as to be along this side (wall side).

As described above, when deciding target positions $Q_3$-$Q_5$ of the third and subsequent times, a direction indicated by a vector that the one before last collision position $C_{m-2}$ is a start point and the last collision position $C_{m-1}$ is an end point is estimated as the traveling direction. Therefore, as shown in FIG. 11, the target positions $Q_4$ and $Q_5$ are decided so as to move diagonally upward along the wall slanting toward the player object 102 as viewed from the player object 102.

Figure 12:
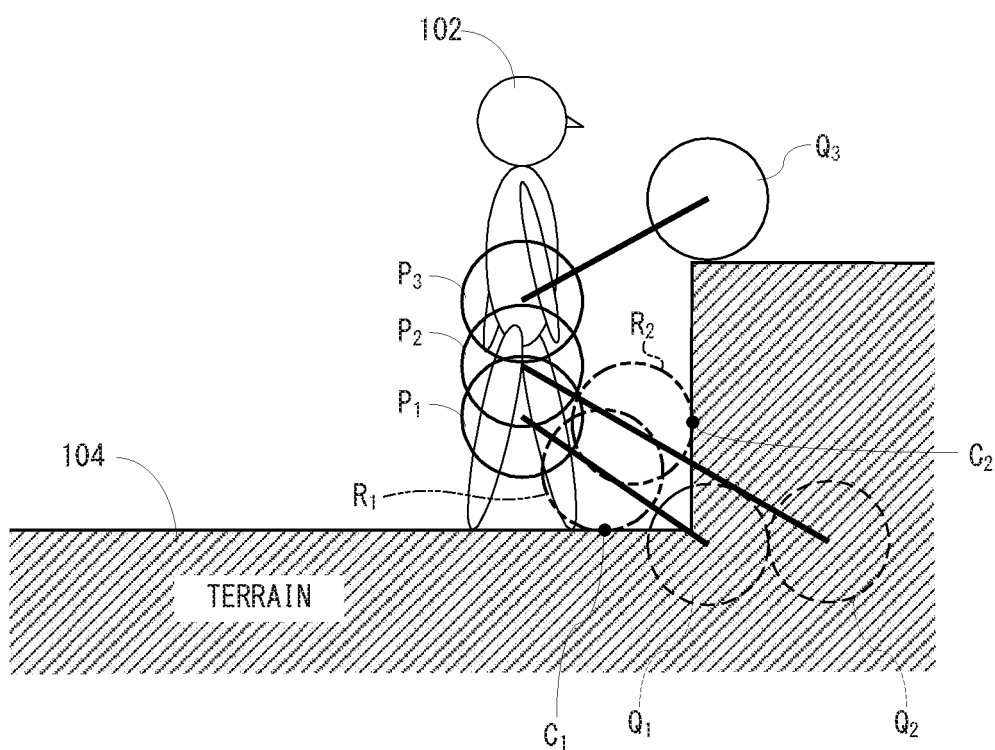
FIG. 12 is an illustration view showing a non-limiting determination method when determining terrain of a low wall.

As shown in FIG. 12, when there is a comparatively low wall (step difference) in the traveling direction of the player object 102, the collision position $C_1$ is located on the flat ground surface in a place near the player object 102 and the collision position $C_2$ exists on the wall side. In case that the determination object 120 is cast for the third time, this determination object 120 does not collide with the terrain object 104.

Figure 13:
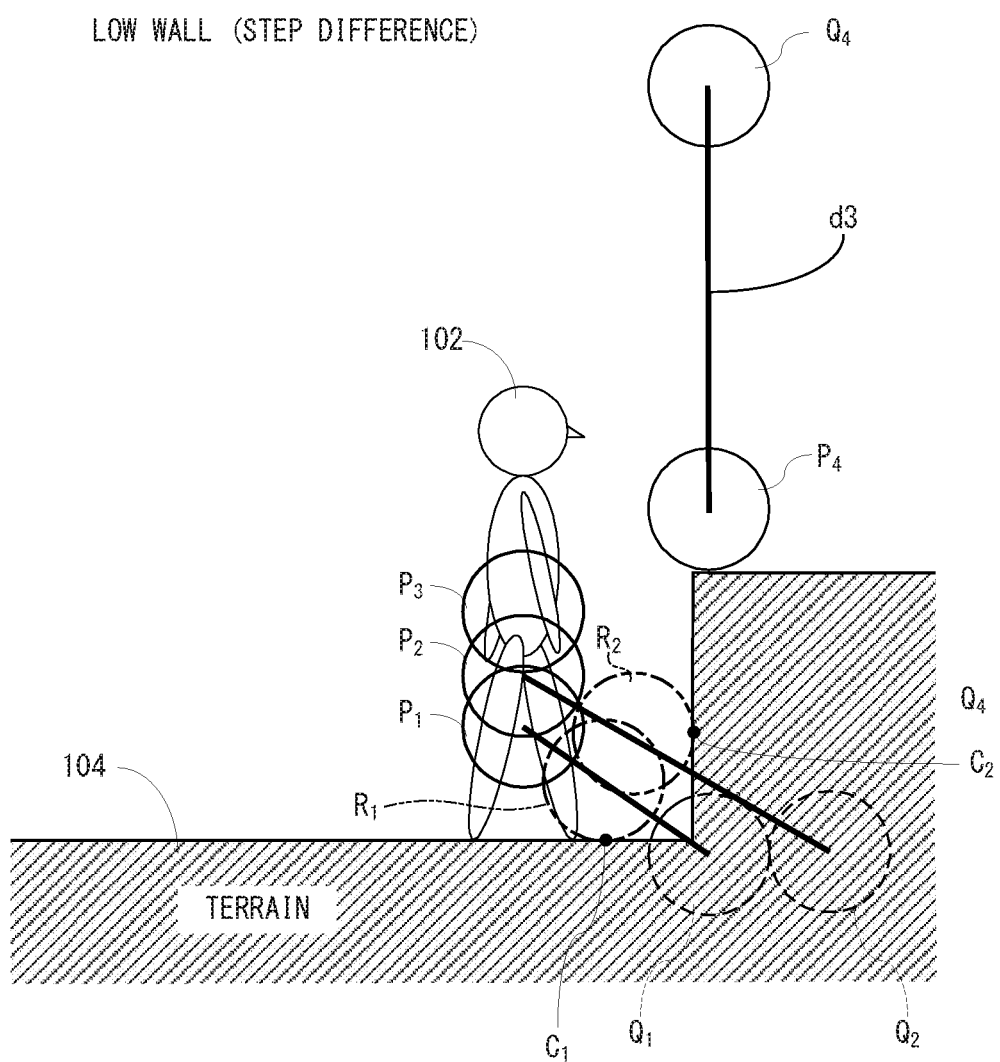
FIG. 13 is another illustration view showing a non-limiting determination method when determining terrain of a low wall.

In such a case, as shown in FIG. 13, the current target position (here, the third time target position $Q_3$) is decided as an additional start position $P_4$, and a position that is shifted vertically upward from the additional start position $P_4$ by the predetermined distance d3 (in this embodiment, a stature (height) of the player object) is decided as an additional target position $Q_4$. That is, the target position $Q_4$ is decided according to the third rule.

A reason why the additional start position $P_4$ and the additional target position $Q_4$ are thus decided is that, when a hole is formed in a part of the wall or there is unevenness on the wall side, for example, it should be determined whether the wall continues further upward in case that the determination object 120 at the previous time did not collide with the terrain object 104. Moreover, it is because since the direction that determination object 120 was cast at the last time is upward direction (diagonally upward), it can be estimated that there is terrain such as a wall or uphill (slope) in front (traveling direction) of the player object 102.

As shown also in FIG. 13, here, since there is a wall lower than the player object 102 ahead of the player object 102, the determination object 120 that is cast toward the additional target position $Q_4$ from the additional start position $P_4$ does not collide with the terrain object 104.

Figure 14:
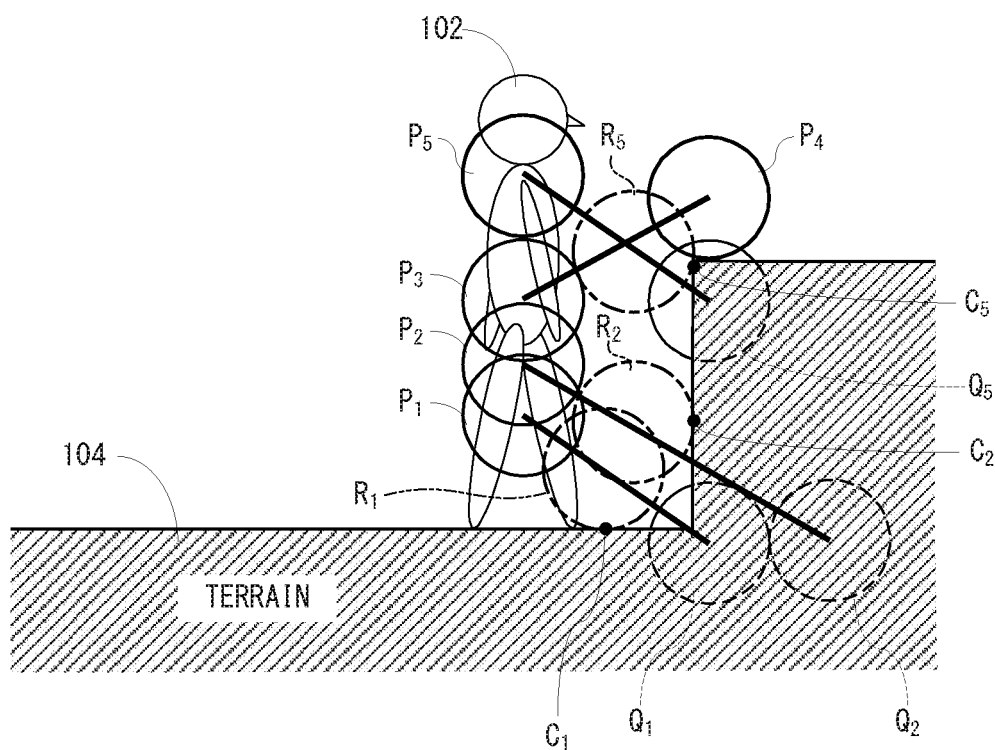
FIG. 14 is a further illustration view showing a non-limiting determination method when determining terrain of a low wall.

In such a case, as shown in FIG. 14, a next start position $P_5$ is decided above the start position $P_3$ at the last time by approximately the diameter (in this embodiment, diameter) of the determination object 120 excluding the additional start position $P_4$, a position that is shifted by a predetermined distance obliquely downward from the start position $P_5$ in the traveling direction is decided as a next target position $Q_5$. Here, like a case where the target position $Q_1$ of the first time is decided, the target position $Q_5$ is decided at a position that is shifted by the predetermined distance d1 obliquely downward by a predetermined angle θ (theta).

As shown also in FIG. 14, if the determination object 120 is cast toward the target position $Q_5$ from the start position $P_5$, as indicated by the collision position $C_5$, the determination object 120 collides with a side of an uppermost part of the wall, for example.

That is, as a result of casting the determination object 120 five times, the collision positions $C_1$, $C_2$ and $C_5$ are acquired. As a result of conducting the principal component analysis from these collision positions $C_1$, $C_2$ and $C_5$, it can be realized that there is a wall or uphill with the inclination a in front of the player object 102. Moreover, since the height of the terrain can be known from the three-dimensional coordinate of each of the collision positions $C_1$, $C_2$ and $C_5$, finally, it can be realized that there is a low wall or a short uphill.

In addition, instead of the principal component analysis, a regression line may be evaluated. In this case, an inclination of the regression line is determined as an inclination of the ground. However, since the regression line is expressed as a primary function only by a least squares method, it is impossible to evaluate a correlation when a plurality of points (collision positions) are arranged in line horizontally or vertically, and therefore, there is a case where it cannot correctly determine the inclination of the ground. Moreover, when the points of X and Y vary, the regression line approaches the horizontal in its inclination, and therefore, if being subjected to linear line approximation, the determined inclination of the ground becomes gentler than the inclination (shape) of the actual ground.

Moreover, in the above-described description, although a target position of a next time for the determination object 120 is decided using the normal vector n of the ground at the collision position $C_m$ if the determination object 120 collides with the terrain object 104, in fact, the normal vector n is recalculated in order to correct a positional deviation due to an inclination in a direction intersecting the traveling direction of the player object 102 (left and right direction).

Figure 15A:
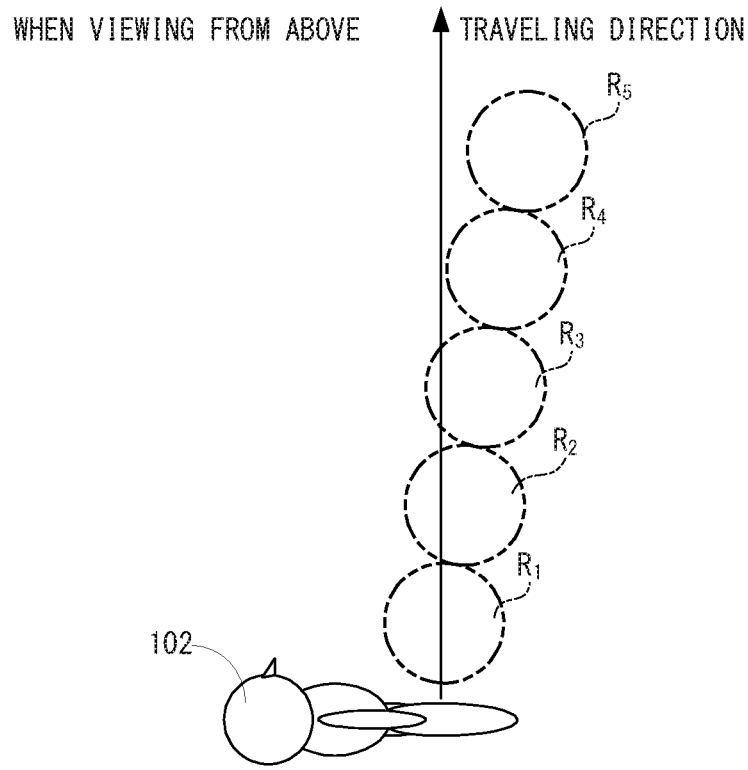
FIG. 15A is an illustration view showing a collision position when viewing from the above a player object standing vertically on the ground inclined to the left and right when not correcting a normal at a collision position.
Figure 15B:
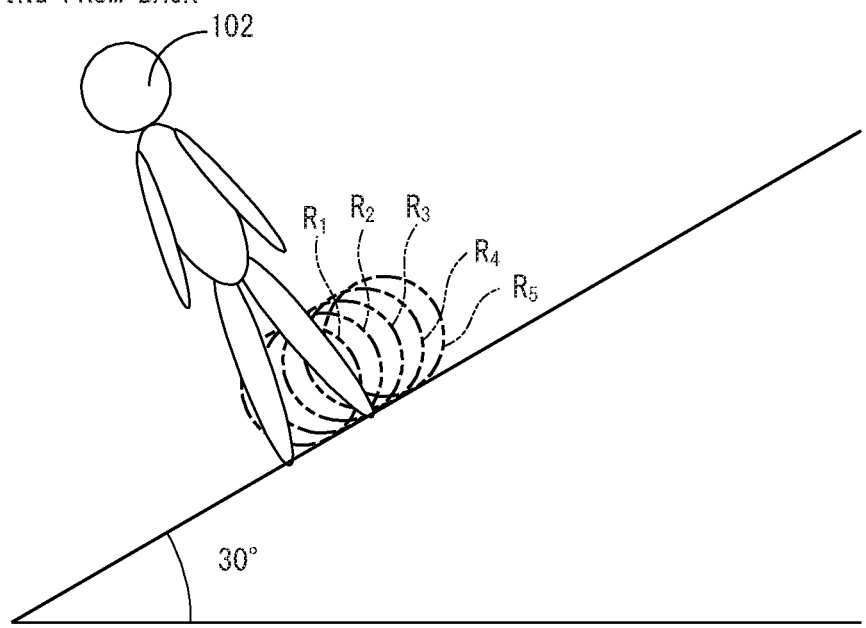
FIG. 15B is an illustration view showing the collision position when viewing from the back the player object standing vertically on the ground inclined to the left and right when not correcting the normal at the collision position.

For example, FIG. 15A and FIG. 15B are illustration views showing an example of a virtual space when the ground slants in the direction intersecting the traveling direction of the player object 102. However, FIG. 15A is an illustration view that the virtual space is viewed from the above the player object 102, and FIG. 15B is an illustration view that the virtual space is viewed from the back of the player object 102.

In addition, FIG. 15A and FIG. 15B show only the determination object 120 at the time of colliding with the terrain object 104. This is true in FIG. 16A and FIG. 16B.

In FIG. 15A and FIG. 15B, the player object 102 stands perpendicular to the ground that slants so as to rise from the left to the right with respect to the traveling direction. When determining the inclination of the ground in the traveling direction of the player object 102, as described above, the determination object 120 is cast toward the target position $Q_m$ that is decided from the start position $P_m$ of each time. Here, since the ground slants in a direction intersecting the traveling direction of the player object 102, the determination object 120 collides with the ground at a slightly deviated point (here, diagonally right lower point) rather than at a point of the lowest end.

Therefore, if deciding a target position $Q_{m+1}$ of a next time using the normal vector n of the ground at the collision position $C_m$, the determination object 120 becomes to be cast toward a position deviated from the traveling direction of the player object 102. Moreover, as shown also in FIG. 15A and FIG. 15B, such deviation from the traveling direction is accumulated as the number of times of casting the determination object 120 increases.

As described above, when performing the principal component analysis, since a plurality of detected collision positions $C_m$ (points) are projected onto the two-dimensional plane that is virtually provided in the traveling direction of the player object 102, the above-described positional deviation may be absorbed; however, in order to determine (detect) an exact inclination in the traveling direction of the player object 102, the normal vector n is recalculated.

Specifically, the normal vector n is recalculated according to Equation 2. Here, Vx is a direction vector of a just beside direction (in this embodiment, right direction) of the player object 102, Vt is a tangent vector of the ground at the collision position, and $n_r$ is a recalculated (corrected) normal vector. In addition, in Equation 2, "x" means an cross (outer) product. Moreover, the recalculated normal vector $n_r$ is normalized. That is, the normal vector $n_r$ is converted into a unit vector that a size is 1 (one).

$$Vt = n \times Vx$$

$$n_r = Vt \times Vx \qquad \text{[Equation 2]}$$

Figure 16A:
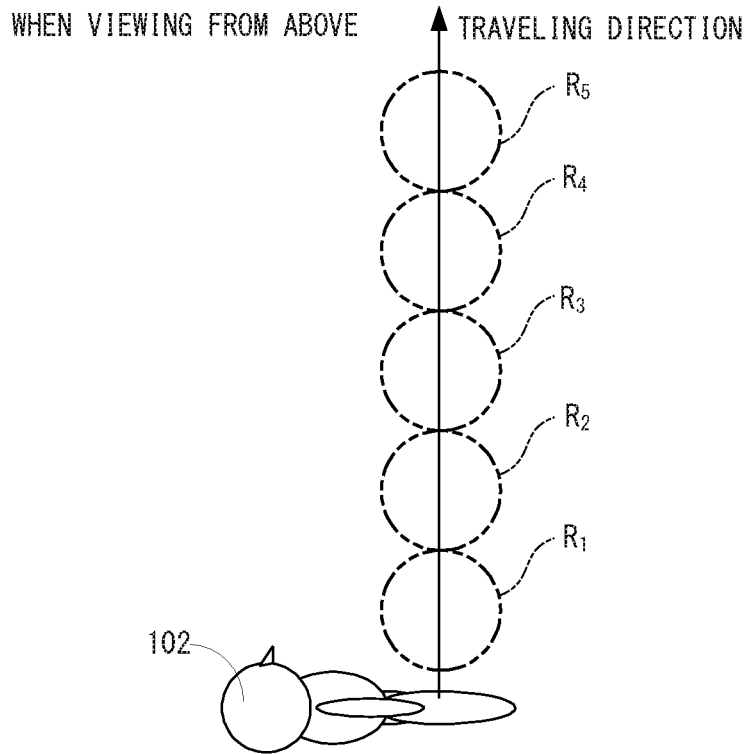
FIG. 16A is an illustration view showing a collision position when viewing from the above a player object standing vertically on the ground inclined to the left and right when correcting a normal at a collision position.
Figure 16B:
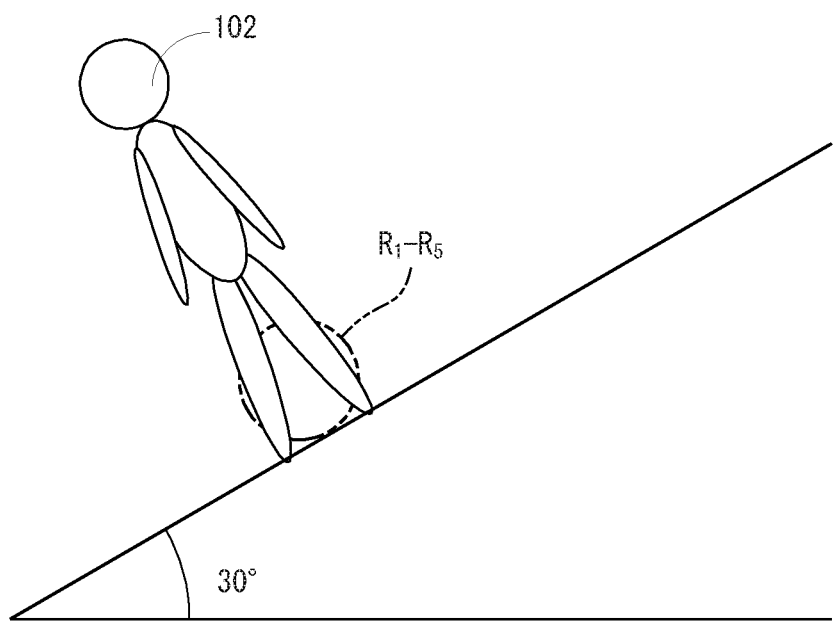
FIG. 16B is an illustration view showing the collision position when viewing from the back the player object standing vertically on the ground inclined to the left and right when correcting the normal at the collision position.

By using the normal vector $n_r$ that is obtained by thus recalculating (correcting) the normal vector n, even when the player object 102 exists on the ground that slants in a direction intersecting the traveling direction as shown in FIG. 16A and FIG. 16B, the target position $Q_m$ can be set without deviation from the traveling direction of the player object 102. Therefore, it is possible to determine terrain in the traveling direction of the player object 102 accuracy.

Next, a cliff side determination will be described. As described above, since the determination object 120 is moved from the start position $P_1$ downwardly by a predetermined angle θ (theta), when the player object 102 exists in a position so as to look down on a cliff or a position looking down a steep downhill, it is thought that the determination object 120 does not collide with the terrain object 104 (ground). Furthermore, when the player object 102 exists in a position with steep ups and downs, the determination object 120 may not collide with the terrain object 104 similarly. Therefore, cliff side determination processing is performed as described below.

In addition, in the cliff side determination processing (expanded cliff side determination processing described later is the same), a deciding method of a start position $P_m$ and a target position $Q_m$ differs from a case of determining other terrain, as described in the following.

FIG. 17-FIG. 19 are illustration views for explaining a non-limiting example method of performing determination on whether there is a cliff in the traveling direction of the player object 102 (cliff side determination). However, in an example shown in FIG. 17-FIG. 19, a case where the determination object 120 of a first time does not collide with the terrain object 104 (ground) will be explained.

In addition, even in a second and subsequent times, when the number of times of casting the determination object 120 does not reach a predetermined number of times, if the determination object 120 that is cast downward (obliquely downward) does not collide with the terrain object 104, similar cliff side determination is performed.

Figure 17A:
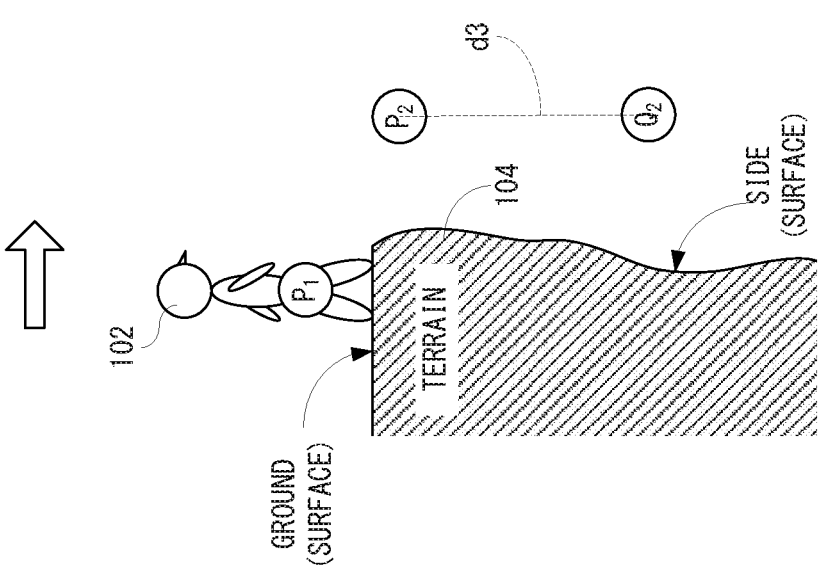
FIG. 17A is an illustration view showing an initial situation that terrain determination processing is started when the player object is standing on a cliff.

As shown in FIG. 17A, as described above, in the first time, a position that is moved downward by a predetermined distance d1 and a predetermined angle θ (theta) from the traveling direction of the player object 102 with respect to the start position $P_1$ for the determination object 120 decided in advance is decided as the target position $Q_1$. In an example shown in FIG. 17A, in case that the determination object 120 is cast toward the target position $Q_1$ from the start position $P_1$, the determination object 120 does not collide with the terrain object 104 (ground).

In this case, in order to determine whether processing that determines whether a cliff is provided in the traveling direction of the player object 102 (cliff side determination processing) is to be performed, the target position $Q_1$ is further decided as an additional start position $P_2$, and an additional target position $Q_2$ is decided in a position that is shifted from the additional start position $P_2$ downward (just below direction) by a predetermined distance d3 (in this embodiment, a stature (height) of player object 10). That is, the target position $Q_2$ is decided according to a fourth rule.

Figure 17B:
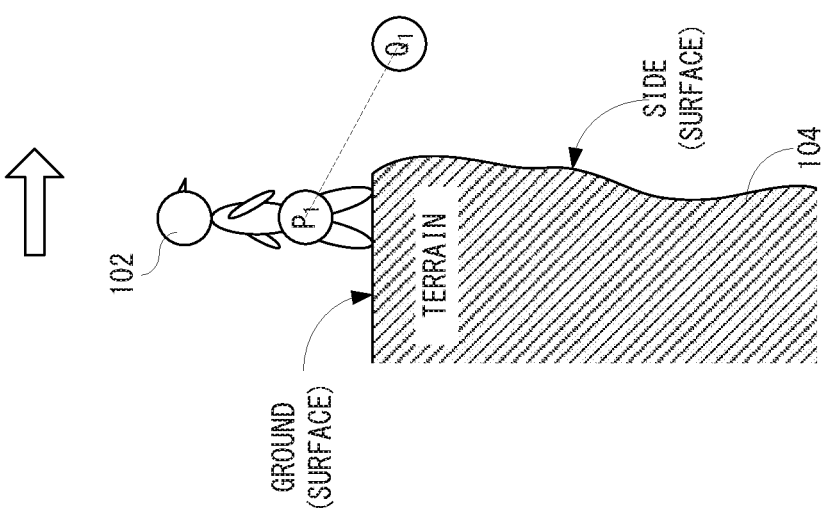
FIG. 17B is an illustration view showing a non-limiting method determining whether cliff side determination processing is to be performed.

As shown in FIG. 17B, in case that the determination object 120 is cast toward the additional target position $Q_2$ from the additional start position $P_2$, the determination object 120 does not collide with the terrain object 104. In such a case, it is determined that the cliff side determination processing is to be performed, and the cliff side determination processing is started.

Although illustration is omitted, if the determination object 120 collides with the terrain object 104 (ground) in case that the determination object 120 is cast toward the additional target position $Q_2$ from the additional start position $P_2$, the cliff side determination processing is not performed. In this case, if the number of times of casting the determination object 120 does not reach the predetermined number of times, a next target position $Q_{m+1}$ is decided based on the normal vector n of the ground at the collision position $C_m$, and the determination object 120 is cast from a next start position $P_{m+1}$ toward the next target position $Q_{m+1}$.

If the cliff side determination processing is started, as shown in FIG. 18A, the last target position $Q_2$ is decided as a start position $P_a$ of a first time in the cliff side determination processing, and a target position $Q_a$ of a first time is decided to a position that is shifted by a predetermined distance d4 in a direction opposite to the traveling direction of the player object 102.

As shown in FIG. 18B, at the first time, the determination object 120 that is cast toward the target position $Q_a$ from the start position $P_a$ collides with the surface of the terrain object 104 (cliff side) as indicated by the position $R_a$. However, the start position $P_a$, the target position $Q_a$ and the position $R_a$ are centers of circles indicated by reference numerals. This is true for start positions $P_b$-$P_d$, target positions $Q_b$-$Q_d$ and positions $R_b$-$R_d$ all described later.

If the determination object 120 collides with the cliff side, as shown in FIG. 19A, a start position $P_b$ of a second time in the cliff side determination processing is decided between the start position $P_2$ and the start position $P_a$ of the first time. That is, the start position $P_b$ is decided to a position that is shifted by a half of the stature of the player object 102 from the start position $P_2$ downward. Moreover, a target position $Q_b$ of a second time is decided to a position that is shifted by the predetermined distance d4 in a direction opposite to the traveling direction.

As shown in FIG. 19B, in the second time, the determination object 120 cast toward the target position $Q_b$ from the start position $P_b$ collides with the surface of the terrain object 104 (cliff side), as indicated by the position $R_b$.

Thus, if the determination object 120 collides with the surface of the terrain object 104 at the position $R_a$ and the position $R_b$, it is determined that there is a cliff looked down from the player object 102 in the traveling direction of the player object 102.

In such cliff side determination processing, it is determined whether the determination object 120 collides with the terrain object 104 by moving the determination object 120 in a direction opposite to the traveling direction of the player object 102 below the current position of the player object 102.

However, since an inclination of the cliff cannot be known only by this determination result, it is impossible to determine terrain is a steep downhill or a cliff eroded at a side of the player object 102. Therefore, even when the cliff side determination processing is performed, the collision position $C_m$ of the determination object 120 is conducted to the principal component analysis, and terrain that is determined as a cliff is further classified into any one of a precipitous cliff, a steep downhill and a cliff eroded in a side of the player object 102.

Therefore, if the surface information included in the related information prohibits gripping the ground when it is determined that there is a steep downhill, the player object 102 is displayed so as to be slip down. Moreover, if the surface information included in the related information does not prohibit to grip the ground when it is determined that there is a step downhill or a precipitous cliff, the player object 102 is displayed so as to descend a steep slope or a cliff while gripping the steep slope or a cliff side. Furthermore, if the surface information included in the related information prohibits gripping the ground when terrain is a cliff eroded at a side of the player object 102, it is controlled that the player object 102 cannot descend a steep slope or a cliff. Moreover, if the player object 102 falls off a cliff in such a case, a mistake occurs, a game over occurs, or the remaining number of the player object 102 is subtracted by 1 (one).

Figure 22:
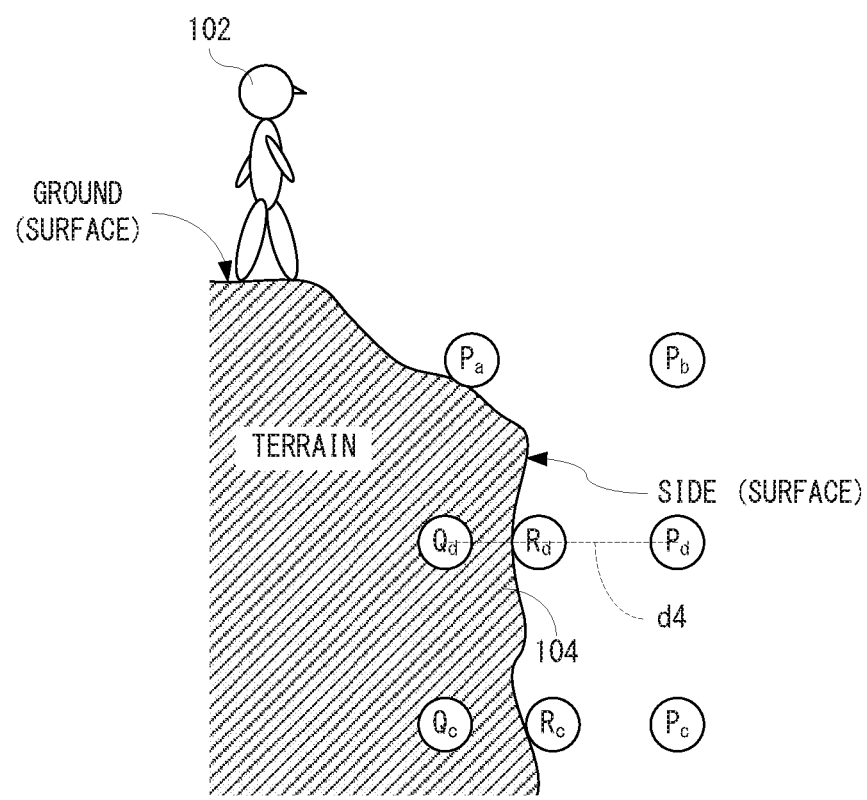
FIG. 22 is an illustration view showing a non-limiting method for deciding a start position and a target position and the collision position at a fourth time for the determination object.

FIG. 20-FIG. 22 illustrate a non-limiting example method for determining a cliff that is slightly different from the cliff illustrated in FIG. 17-FIG. 19 in their forms, and such a method will be described. In order to distinguish from the cliff side determination of FIG. 17-FIG. 19, in the following, cliff side determination of FIG. 20-FIG. 22 is called "expanded cliff side determination". The cliff shown in FIG. 20-FIG. 22 is different from the cliff illustrated in FIG. 17-FIG. 19 in a point that a top surface of the cliff is a slightly downhill in the traveling direction of the player object 102.

Figures 20A, 20B:
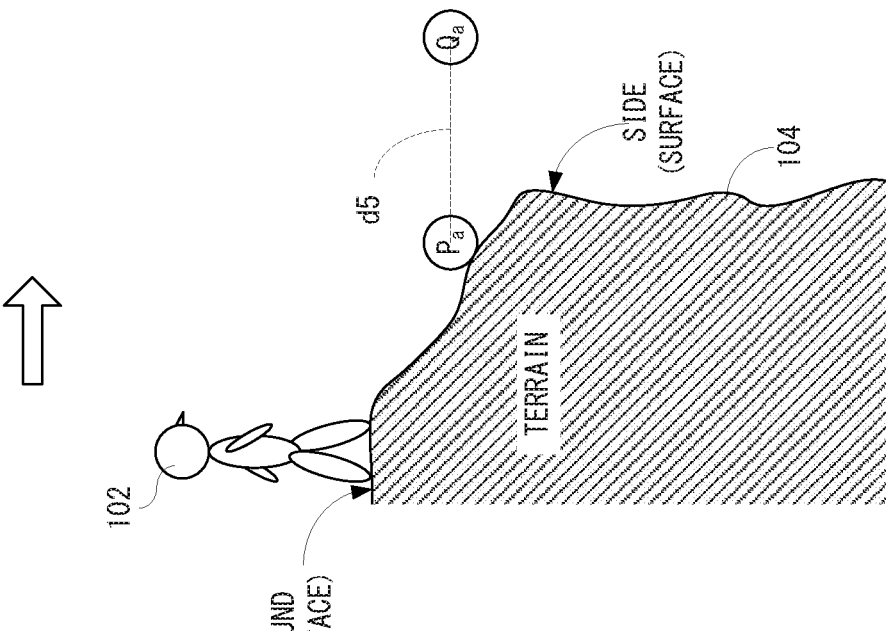
FIG. 20A is an illustration view showing a non-limiting method determining whether expanded cliff side determination processing is to be performed.
FIG. 20B is an illustration view showing a non-limiting method for deciding a start position and a target position at a first time for the determination object in the expanded cliff side determination processing.

FIG. 20A shows a position $R_5$ that the determination object 120 collides in a final time after the determination object 120 is cast the predetermined number of times (in this embodiment, 5 (five) times). In this embodiment, after the determination object 120 is cast the predetermined number of times, it is determined whether a height (Z coordinate) of the position $R_5$ that the determination object 120 collides with the terrain object 104 in the final time is lower than a height (Z coordinate) of a position (foot position) of the player object 102 by a predetermined distance h or more. The predetermined distance h is a value that the developer of the game etc. decided.

If the height of the position $R_5$ is lower than the height of the foot position of the player object 102 but a difference H therebetween is less than the predetermined distance h, expanded cliff side determination processing is not performed. Therefore, terrain is determined based on a result of the principal component analysis of the collision positions $C_1$-$C_5$ obtained in case that the determination object 120 is previously cast the predetermined number of times.

On the other hand, if the height of the position $R_5$ is lower than the height of the foot position of the player object 102 and the difference H therebetween is equal to or more than the predetermined distance h, the expanded cliff side determination processing is performed. If the expanded cliff side determination processing is started, the position $R_5$ that the determination object 120 collides with the terrain object 104 in the final time in case that the determination object 120 is cast the predetermined number of times is decided as a start position $P_a$ of a first time in the expanded cliff side determination processing. Moreover, a position that is shifted by a predetermined distance d5 in the traveling direction from this start position $P_a$ is decided as a target position $Q_a$ of a first time. Then, the determination object 120 is cast toward the target position $Q_a$ from the start position $P_a$.

In case that the determination object 120 collides with the terrain object 104 between the start position $P_a$ and the target position $Q_a$, it is determined that terrain is not a cliff, and the expanded cliff side determination processing is ended. In such a case, it is thought that the ground has steep ups and downs and thus there is a comparatively large hole or recess in the traveling direction of the player object 102, for example.

On the other hand, since it is thought that there is a downhill or a cliff in the traveling direction of the player object 102 in case that the determination object 120 does not collide with the terrain object 104 between the start position $P_a$ and the target position $Q_a$, the target position $Q_a$ is decided as a next start position $P_b$. Processing after the start position $P_b$ is decided is the same as the processing after the processing in a case of casting of the determination object 120 in the second time shown in FIG. 17B. Therefore, subsequent processing will be briefly explained.

If the next start position $P_b$ is decided, a target position $Q_b$ is decided at a position that is shifted downward (just below direction) by the predetermined distance (stature of player object 102). On a cliff as shown in FIG. 20-FIG. 22, even if the determination object 120 is cast toward the target position $Q_b$ from the start position $P_b$, the determination object 120 does not collide with the terrain object 104 (ground).

In this case, as shown in FIG. 21A, the target position $Q_b$ is decided as a next start position $P_c$, and a next target position $Q_c$ is decided at a position that is shifted by a predetermined distance d4 in a direction opposite to the traveling direction. As shown in FIG. 21B, the determination object 120 cast toward the target position $Q_c$ from the start position $P_c$ collides with a cliff side, as indicated by the position $R_c$.

If the determination object 120 collides with the cliff side as shown in FIG. 21B, as shown in FIG. 22, a next start position $P_d$ is decided between the start position $P_b$ and the start position $P_c$. Moreover, the target position $Q_d$ is decided at a position that is shifted by approximately the predetermined distance d4 in a direction opposite to the traveling direction.

As shown in FIG. 22, the determination object 120 that is cast toward the target position $Q_d$ from the start position $P_d$ collides with the cliff side, as indicated by the position $R_d$.

Thus, if the determination object 120 collides with the terrain object 104 at the position $R_c$ and the position $R_d$, in the traveling direction of the player object 102, it is determined that there is a cliff looked down by the player object 102 at a point a little down the hill in the traveling direction of the player object 102.

Figure 23:
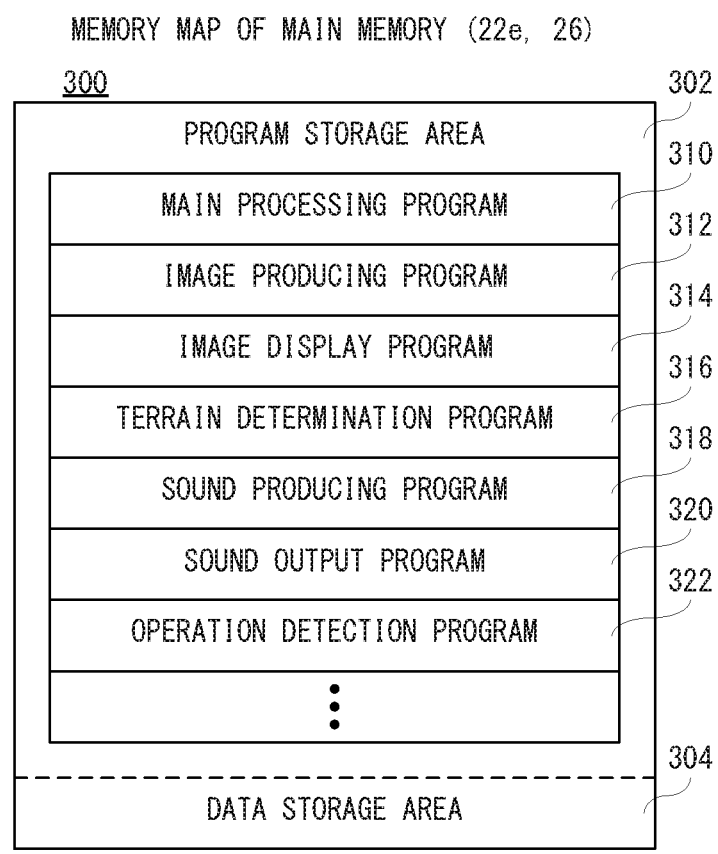
FIG. 23 is an illustration view showing a non-limiting example memory map of a main memory shown in FIG. 2.

FIG. 23 shows a non-limiting example memory map 300 of the main memory (22e, 26) of the game apparatus 12 shown in FIG. 2. As shown in FIG. 23, the main memory (22e, 26) includes a program storage area 302 and a data storage area 304. Information processing programs, such as a game program are stored in the program storage area 302. For example, a game program is partly or entirely read from an optical disk at a proper timing after a power supply is turned on of the game apparatus 12, and stored in the main memory (22e, 26).

In addition, in replace with the optical disk, a game program may be acquired from a flash memory 24 or an external information processing apparatus of the game apparatus 12 (via Internet). Moreover, a part of programs included in a game program may be stored in advance in the game apparatus 12.

In this embodiment, the game program is constituted by a main processing program 310, an image producing program 312, an image display program 314, a terrain determination program 316, a sound producing program 318, a sound output program 320, an operation detection program 322, etc.

The main processing program 310 is a program for performing processing (entire processing in FIG. 25) of a main routine of a virtual game. The image producing program 312 is a program for producing a game image for television with using image producing data 334 including polygon data, texture data, etc. Moreover, the image producing program 312 decides and reproduces animations of character objects, such as the player object 102 etc. according to terrain that is determined according to the terrain determination program 316 described later.

The image display program 314 is a program for outputting the image data of the game image for television produced according to the image producing program 312 to the AV-IC 36 so as to display the game image for televisions on the television 16.

The terrain determination program 316 is a program for determining terrain in a traveling direction of the player object 102. An animation of the player object 102 produced (reproduced) according to the image producing program 312 is decided with using this determination result.

The sound producing program 318 is a program for producing, by the DSP 22c, a game sound for television under instructions of the CPU 20. The sound output program 320 is a program for outputting sound data of a game sound for television produced according to the sound producing program 318 to the AV-IC 36 so as to output the game sound for television from the speaker 16a of the television 16.

The operation detection program 322 is a program for detecting (receiving) operation data included in transmission data that is input (transmitted) from the terminal device 14.

In addition, a communications program, a backup program, etc. are also stored in the program storage area 302.

Figure 24:
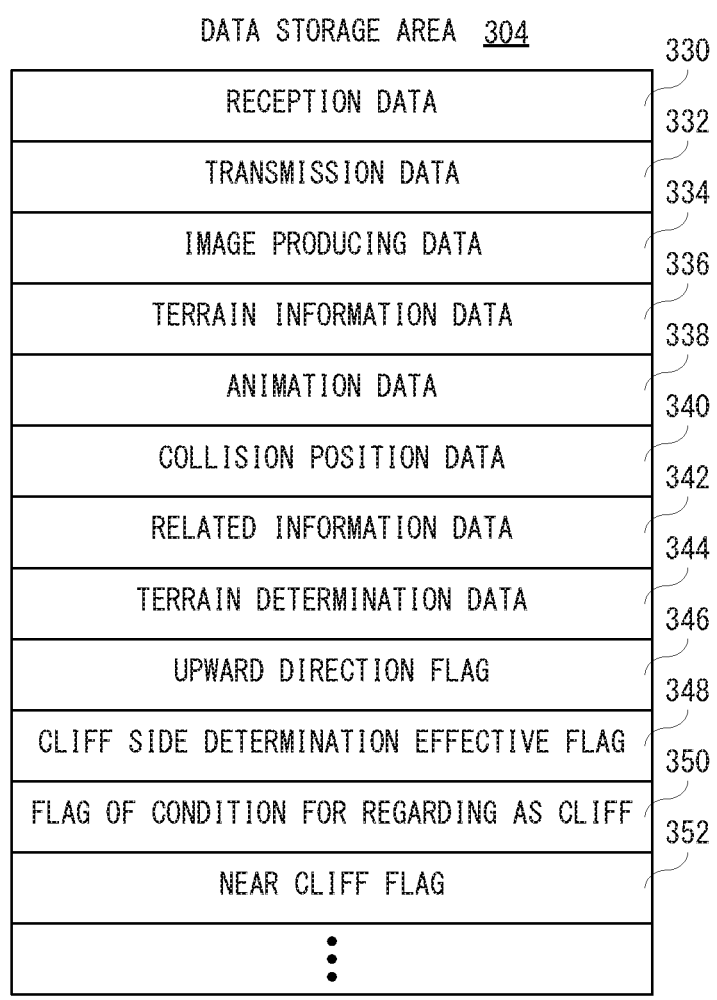
FIG. 24 is an illustration view showing a non-limiting example data storage area shown in FIG. 23.

FIG. 24 is an illustration view showing non-limiting example specific contents of the data storage area 304 shown in FIG. 23.

In the data storage area 304, reception data 330, the transmission data 332, the image producing data 334, terrain information data 336, animation data 338, collision position data 340, related information data 342, terrain determination data 344, etc. are stored. Moreover, an upward direction flag 346, a cliff side determination effective flag 348, a flag of condition for regarding as cliff 350, a near cliff flag 352, etc. are provided in the data storage area 304.

The reception data 330 is various kinds of data received from the terminal device 14. The reception data 330 includes operation data. The operation data is data indicative of an operation of the player to the terminal device 14, and as described above, it includes operation button data, stick data and touch position data. However, the operation data may be any data as long as it represents the operation of the player who operates the terminal device 14, and may include only one of the above-described data. The operation data is transmitted from the terminal device 14 and acquired in the game apparatus 12, and is stored in the main memory (22e, 26).

In addition, the operation data may be stored in the main memory (22e, 26) the predetermined number sequentially from the newest data (data acquired at the last).

The transmission data 332 is various kinds of data to be transmitted to the terminal device 14. The image producing data 334 is data required in order to produce an image, such as polygon data, texture data, etc. The terrain information data 336 is data of a normal vector respectively corresponding to polygons constituting the terrain object 104 and surface information that are set to respective polygons. The data of a normal vector is data about a vector perpendicular to the surface of the terrain object 104. The surface information is information that is set in the polygon constituting a wall surface or a cliff side, and indicates whether to prohibit the player object 102 from gripping.

The animation data 338 is data about an animation of character objects (moving image object), such as the player object 102, an enemy object, etc. In this embodiment, the animation data 338 includes data about an animation that is produced in advance for each action about each of the character objects.

The collision position data 340 is data about a position that is determined to collide with the terrain object 104 in case that the determination object 120 is cast toward a target position. However, since the determination object 120 is cast a plural of number of times and a start position and a target position differ for each time, data of for each collision position are stored in the data storage area 304 in identifiable manner.

The related information data 342 is data of a normal vector and data of ground information of a polygon constituting the terrain object 104 at the collision position $C_m$, and stored in association with data of the collision position $C_m$.

The terrain determination data 344 is data about terrain that is determined by the terrain determination processing according to the terrain determination program 316, i.e., in this embodiment, data about inclination and height of a surface of the terrain object 104 in the traveling direction of the player object 102.

The upward direction flag 346 is a flag for determining whether a direction that the determination object 120 is to be moved is upward. The upward direction flag 346 is turned on when a direction that the determination object 120 is to be moved upward, and turned off when a direction that the determination object 120 is to be moved downward. In this embodiment, a case where a direction that the determination object 120 is to be moved horizontal is included in a case of upward direction. However, a case where a direction that the determination object 120 is to be moved horizontal may be included in a case of downward direction.

The cliff side determination effective flag 348 is a flag for determining whether processing that determines whether there is a cliff looked down by the player object 102 is to be performed. The cliff side determination effective flag 348 is turned on in case that the determination object 120 does not collide with the terrain object 104 in a case where the determination object 120 is cast downward toward the target position in the terrain determination processing, and is turned off otherwise.

The flag of condition for regarding as cliff 350 is a flag for determining whether a condition that there is a cliff looked down by the player object 102 is satisfied. The flag of condition for regarding as cliff 350 is turned on when the condition that there is a cliff looked down by the player object 102 is satisfied, and is turned off otherwise. As described later, it is determined that the condition for regarding as cliff is satisfied when it is determined that there is a cliff in the cliff side determination processing.

The near cliff flag 352 is a flag for determining whether there is a cliff that is looked down by the player object 102 beyond a downhill in the traveling direction of the player object 102. The near cliff flag 352 is turned on when a cliff that is looked down by the player object 102 exists beyond a downhill in the traveling direction of the player object 102, and is turned off otherwise.

Although illustration is omitted, the data storage area 304 is stored with other data such as sound data, sound wave form data, etc., and provided with other flags and counters (timers) required for execution of a game program.

Figure 25:
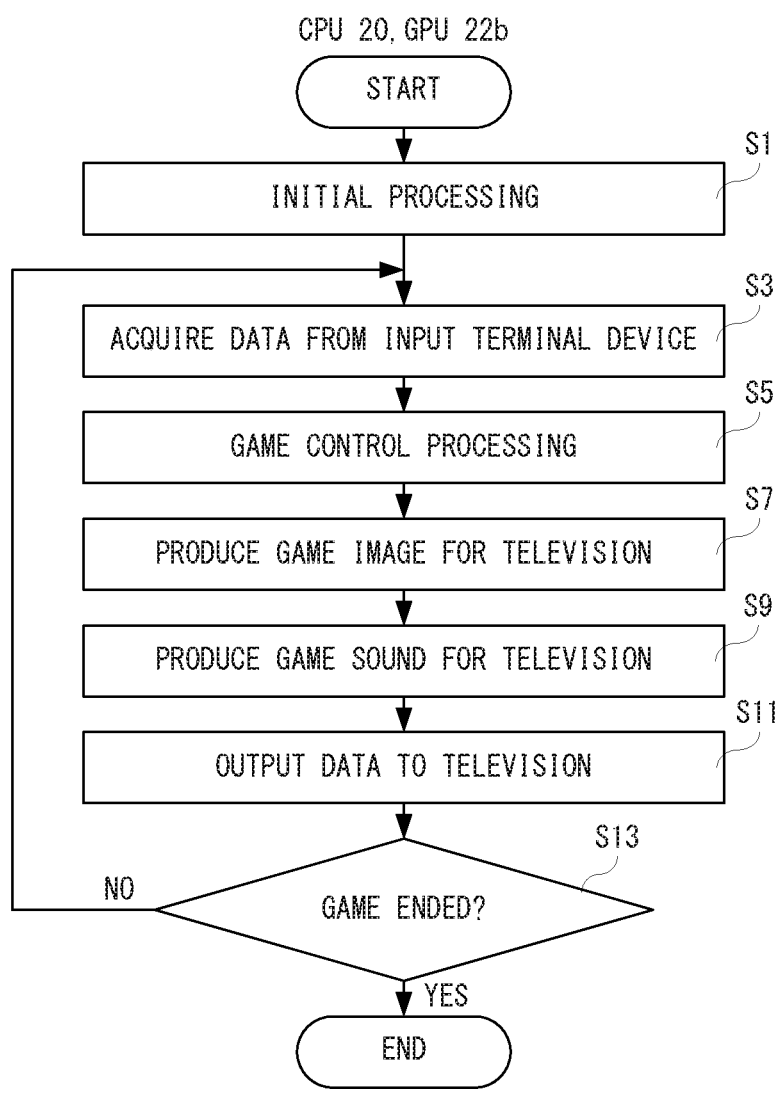
FIG. 25 is a flow chart showing non-limiting example entire processing of a CPU of the game apparatus shown in FIG. 2.

FIG. 25 is a flow chart about non-limiting example entire processing by the CPU 20 provided in the game apparatus 12 shown in FIG. 2. In addition, it is pointed-out in advance that processing in respective steps in the flow chart shown in FIG. 25 (also in FIG. 26 described later) are mere examples, and if the same result is acquired, an order of the respective steps may be changed. Moreover, in this embodiment, basically, it is assumed that the CPU 20 executes the processing of each step of the flowcharts shown in FIGS. 25 and 26; however, some steps may be executed by a processor(s) or a dedicated circuit(s) other than the CPU 20.

If the power supply of the game apparatus 12 is turned on, prior to executing the entire processing, the CPU 20 executes a boot program stored in a boot ROM not shown, whereby respective units such as the main memory (22e, 26) can be initialized. Then, the game program stored in the optical disk is read into the main memory (22e, 26), and execution of the game program concerned is started by the CPU 20.

As shown in FIG. 25, if the entire processing is started, the CPU 20 performs initial processing in a step S1. In the initial processing, for example, the CPU 20 constructs a virtual game space for producing and displaying the game image 150, arranges respective characters or objects such as the player object 102 appearing in this virtual space in initial positions, and arranges respective background objects such as the terrain object 104 etc. being arranged (existing) in this virtual space in predetermined positions. Furthermore, initial processing is also processing that the CPU 20 sets initial values of various parameters to be used in the game processing.

Subsequently, the CPU 20 acquires various kinds of data transmitted from the terminal device 14 in a step S3, and performs game control processing in a step S5. For example, the CPU 20 moves the player object 102 or/and causes the player object 102 to perform an arbitrary action according to the operation data. Moreover, the CPU 20 moves an enemy object or/and causes the enemy object to perform an arbitrary action, without following the operation data. Furthermore, the CPU 20 determines victory and defeat or ranking of the player object 102, or/and determines the game clear or game over.

In a next step S7, the CPU 20 and the GPU 22b perform processing of producing the game image for television to be displayed on the television 16. Briefly describing, the CPU 20 and the GPU 22b read the data indicating a result of the game control processing of the step S5 from the main memory (22e, 26), and read data required in order to produce the game image from the VRAM 22d to produce the game image for television. When producing the game image for television, for example, under instructions of the CPU 20, the GPU 22b arranges the player object 102 to a current position in the virtual space, and arranges a non-player character such as an enemy object. Furthermore, the GPU 22b arranges (produces) the terrain object 104 (background object) according to the current position of the player object 102. Moreover, an animation of the player object 102 determined based on the terrain that is determined in the terrain determination processing performed in parallel with the entire processing and the surface information acquired in the terrain determination processing is reproduced. Therefore, a certain scene (sight) is produced, and an image (imaged image) viewing the scene from a virtual camera is produced as the game image for television.

Subsequently, in a step S9, the CPU 20 produces a game sound for television to be output to the speaker 16a of the television 16. That is, the CPU 20 causes the DSP 22c to produce the game sound according to a result of the game control processing of the step S5.

Subsequently, the CPU 20 outputs data to the television 16 in a step S11. Specifically, the CPU 20 sends to the AV-IC 36 the image data of the game image for television stored in the VRAM 22d, and the sound data of the game sound for television produced in the step S9 by the DSP 22c.

Then, in a step S13, the CPU 20 determines whether the game is to be ended. Determination in the step S13 is performed, for example, based on whether the game is over or whether the player gives an instruction to stop the game. It is possible to determine whether the game is over based on whether the physical strength value of the player object 102 becomes 0 (zero), for example.

If "NO" is determined in the step S13, that is, if the game is not to be ended, the process returns to the step S3. On the other hand, if "YES" is determined in the step S13, that is, if ending the game, the entire processing is terminated.

Figure 26:
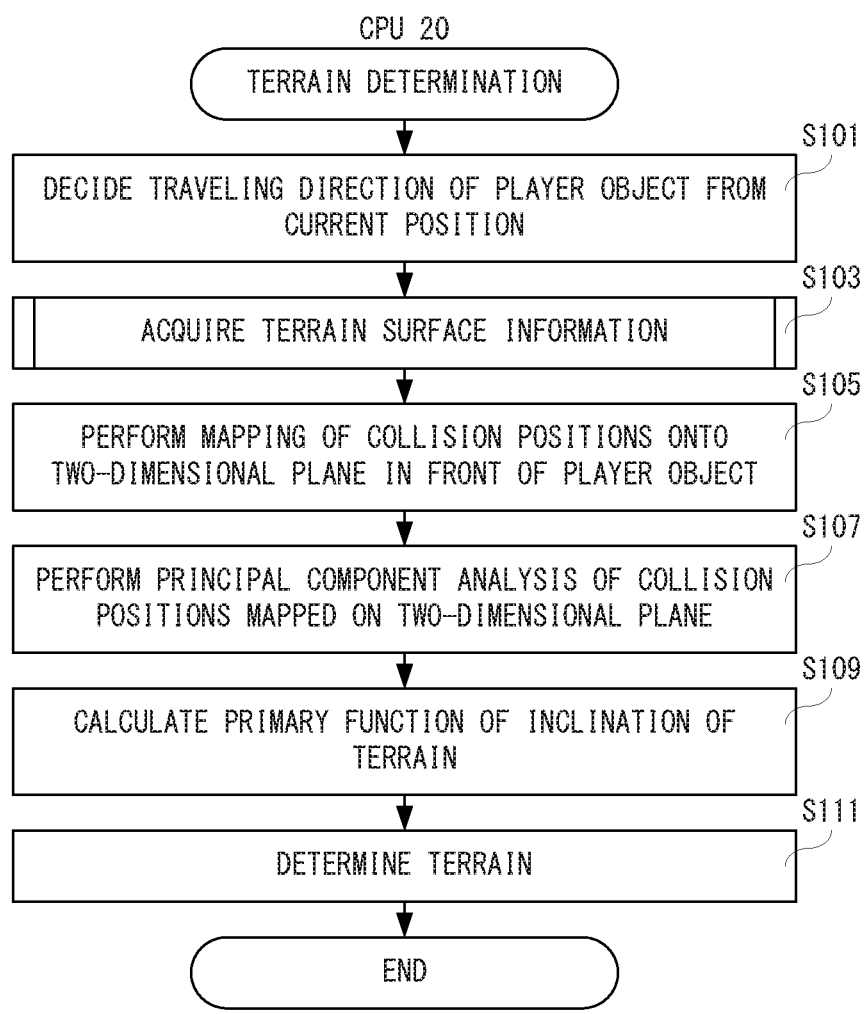
FIG. 26 is a flow chart showing non-limiting example terrain determination processing of the CPU of the game apparatus shown in FIG. 2.

FIG. 26 is a flow chart of non-limiting example terrain determination processing by the CPU 20 performed in parallel with the entire processing shown in FIG. 25. It should be noted that this terrain determination processing is performed repeatedly (for each frame) during the entire processing is performed.

As shown in FIG. 26, if the terrain determination processing is started, the CPU 20 decides a traveling direction of the player object 102 from a current position thereof in a step S101. As described above, a direction that the player object 102 faces is usually a traveling direction when the player object 102 is moving or stopping; however, there is a case where a direction other than the direction that the player object 102 faces may be the traveling direction dependent on terrain.

In a subsequent step S103, terrain surface information acquisition processing (see FIG. 27-FIG. 29) described later is performed. In a next step S105, the collision positions $C_m$ are mapped (projected) on a two-dimensional plane (XY plane of FIG. 8) in front of the player object 102. Subsequently, in a step S107, processing of the principal component analysis about the collision positions $C_m$ that are mapped on the two-dimensional plane is performed, and in a step S109, a primary function about an inclination of terrain based on a result of the principal component analysis processing is calculated. Terrain is determined in a step S111, and the terrain determination processing is ended.

In this step S111, the CPU 20 determines an inclination (angle of slope) of the ground in the traveling direction of the player object 102 based on an inclination a of the primary function, and determines a height of the ground in the traveling direction of the player object 102 based on the collision position $C_m$. These determination methods are as described above.

Moreover, in the step S111, if the flag of condition for regarding as cliff 350 is turned on, the CPU 20 determines that the terrain is a precipitous cliff, a steep downhill or a cliff eroded in a side of the player object 102 according to the inclination a. Furthermore, if the near cliff flag 352 is turned on, the CPU 20 determines that there is a cliff beyond a slope (downhill) that is determined by the inclination a in the traveling direction of the player object 102.

Figure 27:
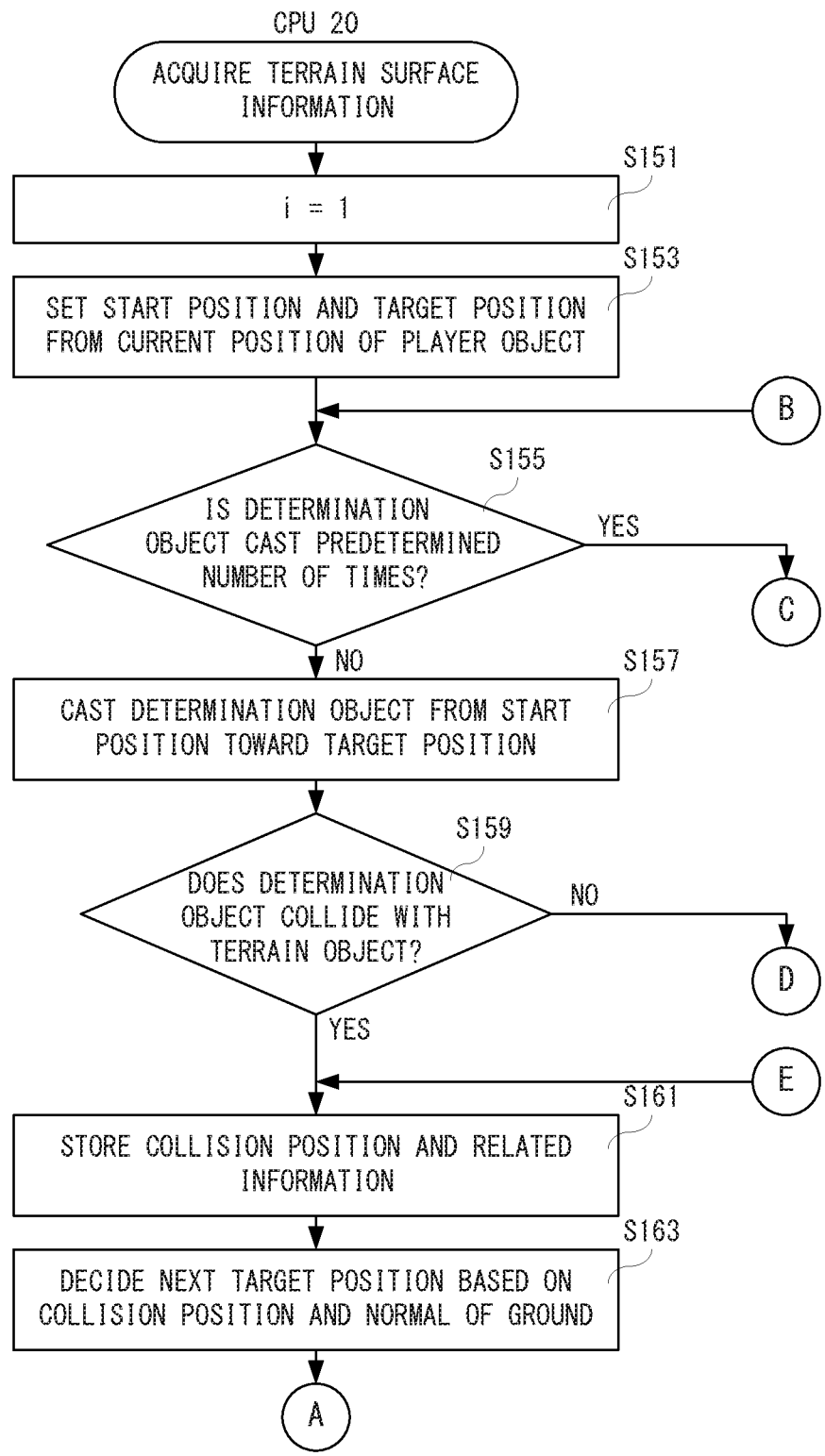
FIG. 27 is a flow chart showing a part of non-limiting example terrain surface information acquisition processing of the CPU of the game apparatus shown in FIG. 2.
Figure 28:
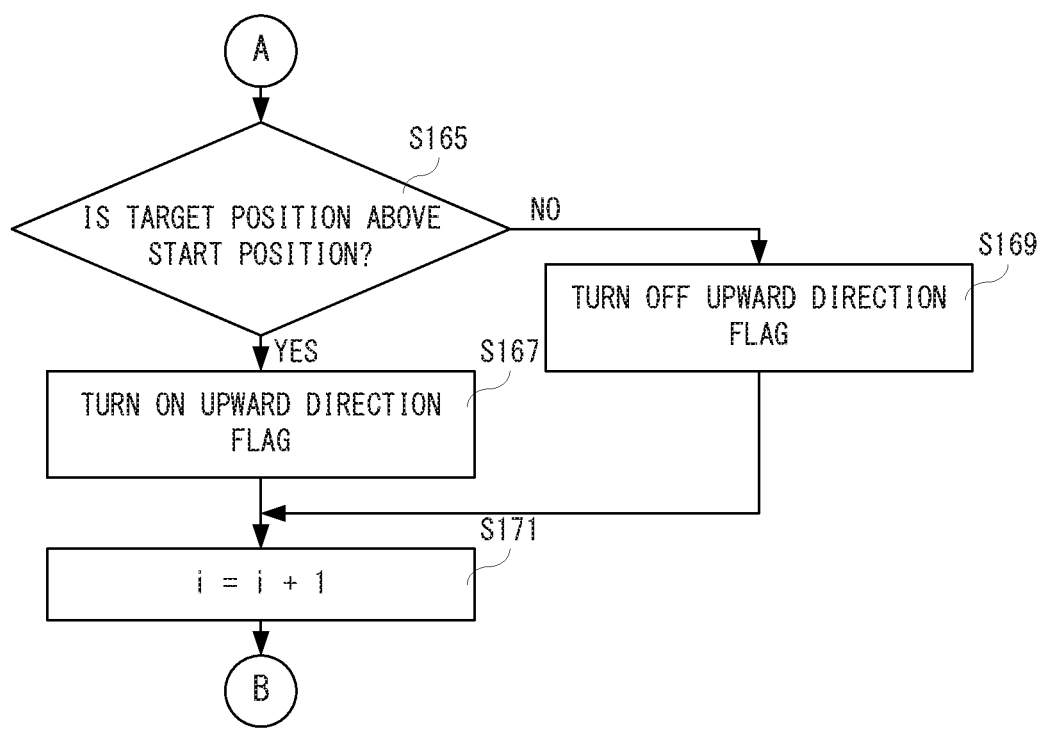
FIG. 28 shows another part of the non-limiting example terrain surface information acquisition processing of the CPU of the game apparatus shown in FIG. 2, following FIG. 27.
Figure 29:
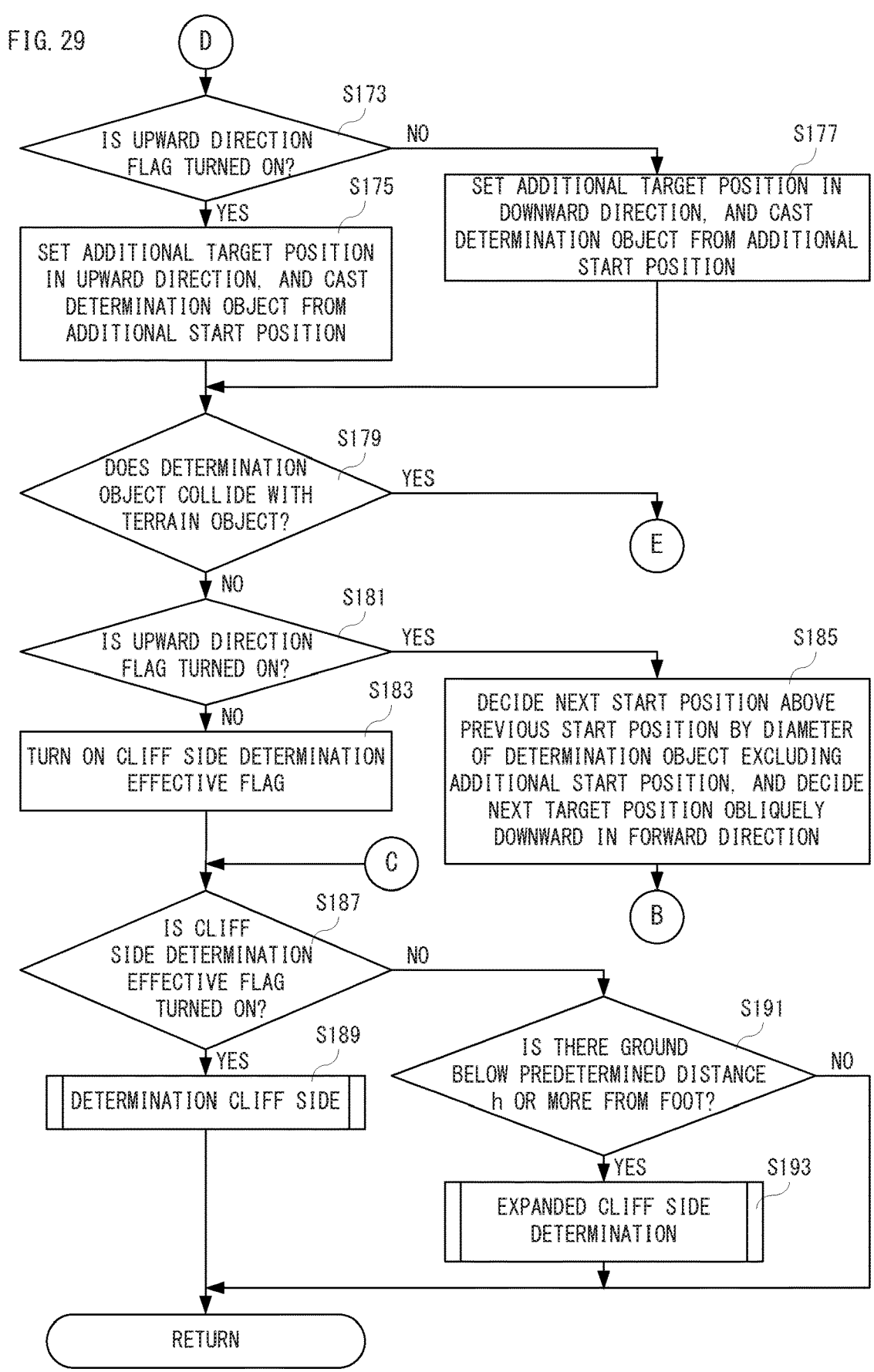
FIG. 29 shows a further part of the non-limiting example terrain surface information acquisition processing of the CPU of the game apparatus shown in FIG. 2, following FIG. 27.

FIG. 27-FIG. 29 are flow charts of non-limiting example terrain surface information acquisition processing shown in the step S103 of FIG. 26. If the terrain surface information acquisition processing is started, the CPU 20 sets an initial value of a variable i (i=1) in a step S151 as shown in FIG. 27. It should be noted that the variable i is a variable for counting the number of times that the determination object 120 is cast (moved) toward the target position (end position) from the start position. Although illustration is omitted, various flags (346-352) are also initialized (turned off) here.

In a next step S153, a start position $P_1$ and a target position $Q_1$ are set (decided) based on a current position of the player object 102. As described above, the start position $P_1$ of the determination object 120 is decided in advance with respect to the position (foot position) of the player object 102, and according to the first rule, the target position $Q_1$ is set to a position that is shifted by the predetermined distance d1 downward by the predetermined angle θ (theta) in the traveling direction of the player object 102.

Subsequently, it is determined, in a step S155, whether the determination object 120 is cast the predetermined number of times. Here, it is determined whether the variable i exceeds a maximum value (in this embodiment, 5 (five)). If "YES" is determined in the step S155, that is, if the determination object 120 is cast the predetermined number of times, the process proceeds to a step S187 of FIG. 29 described later. If "NO" is determined in the step S155, that is, if the number of times of casting the determination object 120 does not reach the predetermined number of times, the determination object 120 is cast (moved) toward the target position $Q_m$ from the start position $P_m$.

In a next step S159, it is determined whether the determination object 120 collides with the terrain object 104. Here, determination on whether the determination object 120 collides with a shape (polygon) of the terrain object 104 (usual collision determination) is performed. In the following, this is true about a case where it is determined whether the determination object 120 collides with the terrain object 104.

If "NO" is determined in the step S159, that is, if the determination object 120 does not collide with the terrain object 104, the process proceeds to a step S173 shown in FIG. 29. On the other hand, if "YES" is determined in the step S159, that is, if the determination object 120 collides with the terrain object 104, a collision position $C_m$ (three-dimensional coordinate) and related information are stored in a step S161. Here, corresponding to identification information of the i-th determination object 120, the collision position data 340 including (being added with) data of the collision position $C_m$ (three dimensional coordinate) that the determination object 120 collides with the terrain object 104 is stored (overwritten) in the data storage area 304 of the main memory (22e, 26). Similarly, corresponding to identification information of the i-th determination object 120, data of a normal vector of the terrain and data of the surface information at the collision position $C_m$ that the determination object 120 collides with the terrain object 104 are acquired from the terrain information data 336, and the related information data 342 including (being added with) the acquired data is stored (overwritten) in the data storage area 304 of the main memory (22e, 26).

In a next step S163, a next target position $Q_m$ is decided based on the collision position $C_{m-1}$ and the normal vector $n_r$ of the ground (or a wall side). However, as described above, when deciding the target position $Q_m$ of the third and subsequent times, the traveling direction of the player object 102 is estimated in a direction indicated by a vector that the one before last collision position $C_{m-2}$ is a start point and the last collision position $C_{m-1}$ is an end point. Moreover, as described above, the normal vector $n_r$ is a vector that is recalculated (corrected) based on the outer product of the direction vector Vx of a just beside direction (right direction) with respect to the traveling direction of the player object 102 and the normal vector n of the actual ground.

As shown in FIG. 28, in a subsequent step S165, it is determined whether the target position $Q_m$ calculated in the step S163 is above than the start position $P_m$ of the next time for the determination object 120. Here, the CPU 20 determines whether the Z coordinate of the target position $Q_m$ of the next time for the determination object 120 is equal to or larger than the Z coordinate of the start position $P_1$ of the next time for the determination object 120.

If "YES" is determined in the step S165, that is, if the target position $Q_m$ is above than the start position $P_m$, the upward direction flag 346 is turned on in a step S167, and the process proceeds to a step S171. If "NO" is determined in the step S165, that is, if the target position $Q_m$ is below the start position $P_m$, the upward direction flag 346 is turned off in a step S169, and the process proceeds to a step S171. In the step S171, the variable i is incremented by 1 (one) (i=i+1), and the process returns to the step S155 shown in FIG. 27. That is, it is determined whether the determination object 120 of the next time collides with the terrain object 104.

As described above, in case that it is determined that the determination object 120 does not collide with the terrain object 104 in the step S159, as shown in FIG. 29, it is determined whether the upward direction flag 346 is turned on in the step S173. That is, when it is determined that the determination object 120 does not collide with the terrain object 104, it is determined whether a direction that the determination object 120 is cast is an upward direction.

If "YES" is determined in the step S173, that is, if the upward direction flag 346 is turned on, in a step S175, the additional (next) target position $Q_{m+1}$ is set upward (just above) the current target position $Q_m$ by the predetermined distance d3 (in this embodiment, the stature (height) of the player object 102), and the determination object 120 to the target position $Q_{m+1}$ is cast from the additional start position $P_{m+1}$, and the process proceeds to a step S179. It should be noted that the additional start position $P_{m+1}$ is the current target position $Q_m$.

On the other hand, if "NO" is determined in the step S173, that is, if the upward direction flag 346 is turned off, in a step S177, the additional (next) target position $Q_{m+1}$ is set downward (just below) the current target position $Q_m$ by the predetermined distance d3 (in this embodiment, the stature (height) of the player object 102), and the determination object 120 is cast to the target position $Q_{m+1}$ from the additional start position $P_{m+1}$, and the process proceeds to the step S179. It should be noted that the additional start position $P_{m+1}$ is the current target position $Q_m$.

Then, in the step S179, it is determined whether the determination object 120 collides with the terrain object 104. If "YES" is determined in the step S179, the process returns to the step S161 shown in FIG. 27. If "NO" is determined in the step S179, it is determined whether the upward direction flag 346 is turned on.

If "YES" is determined in the step S181, in a step S185, the next start position (here, the start position $P_{m+2}$) is decided above the last start position (here, the start position $P_m$) by the diameter of the determination object 120 excluding the additional start position (here, the start position $P_{m+1}$), and the next target position (here, the target position $R_{m+2}$) obliquely downward ahead from the next start position $P_{m+2}$ is decided, and the process returns to the step S155. If "NO" is determined in the step S181, the cliff side determination effective flag 348 is turned on in a step S183, and it is determined, in the step S187, whether the cliff side determination effective flag 348 is turned on.

If "YES" is determined in the step S187, that is, if the cliff side determination effective flag 348 is turned on, the process returns to the terrain determination processing after performing the cliff side determination processing (see FIG. 30) described later in a step S189. On the other hand, if "NO" is determined in the step S187, that is, if the cliff side determination effective flag 348 is turned off, it is determined, in a step S191, whether there is the ground downward from the foot of the player object 102 by the predetermined distance h or more. More specifically, the CPU 20 determines whether there is the collision position $C_m$ that is lower than the foot of the player object 102 and the distance H from the foot is equal to or larger than the predetermined distance h among the collision positions $C_m$ detected by casting the determination object 120 the predetermined number of times.

If "NO" is determined in the step S191, that is, if there is not the ground below the foot of the player object 102 by the predetermined distance h or more, the process returns to the terrain determination processing. On the other hand, if "YES" is determined in the step S191, that is, if there is the ground below the foot of the player object 102 by the predetermined distance h or more, the process returns to the terrain determination processing after the expanded cliff side determination processing (see FIG. 31 and FIG. 32) described later is performed.

Figure 30:
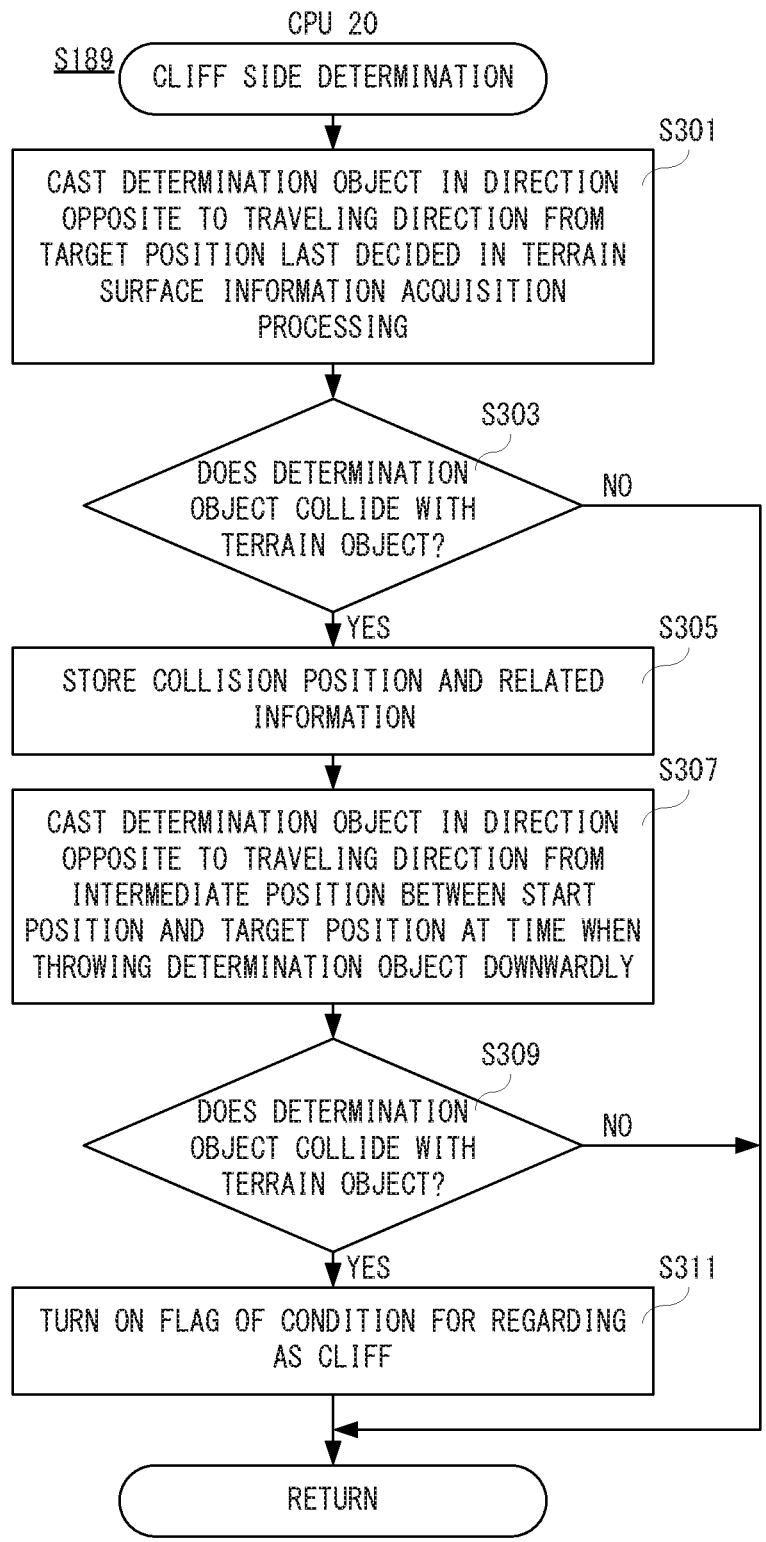
FIG. 30 is a flow chart showing non-limiting example cliff side determination processing of the CPU of the game apparatus shown in FIG. 2.

FIG. 30 is a flow chart showing non-limiting example cliff side determination processing in the step S189 of FIG. 29. As shown in FIG. 30, if the cliff side determination processing is started, in a step S301, the CPU 20 casts the determination object 120 from the target position that is decided at the last of the terrain surface information acquisition processing in a direction opposite to the traveling direction.

In a next step S303, it is determined whether the determination object 120 collides with the terrain object 104. If "NO" is determined in the step S303, the cliff side determination processing is ended, and the process returns to the terrain surface information acquisition processing. On the other hand, if "YES" is determined in the step S303, the collision position $C_m$ and the related information are stored in a step S305, and in a step S307, the determination object 120 is cast from an intermediate position between the start position and the target position in case that the determination object 120 is cast downward in a direction opposite to the traveling direction.

Then, it is determined, in a step S309, whether the determination object 120 collides with the terrain object 104. If "NO" is determined in the step S309, the process returns to the terrain surface information acquisition processing while determining that there is no cliff in the traveling direction of the player object 102. If "YES" is determined in the step S309, it is determined that there is a cliff in the traveling direction of the player object 102, and the process returns to the terrain surface information acquisition processing after the flag of condition for regarding as cliff 350 is turned on in a step S311.

Figure 31:
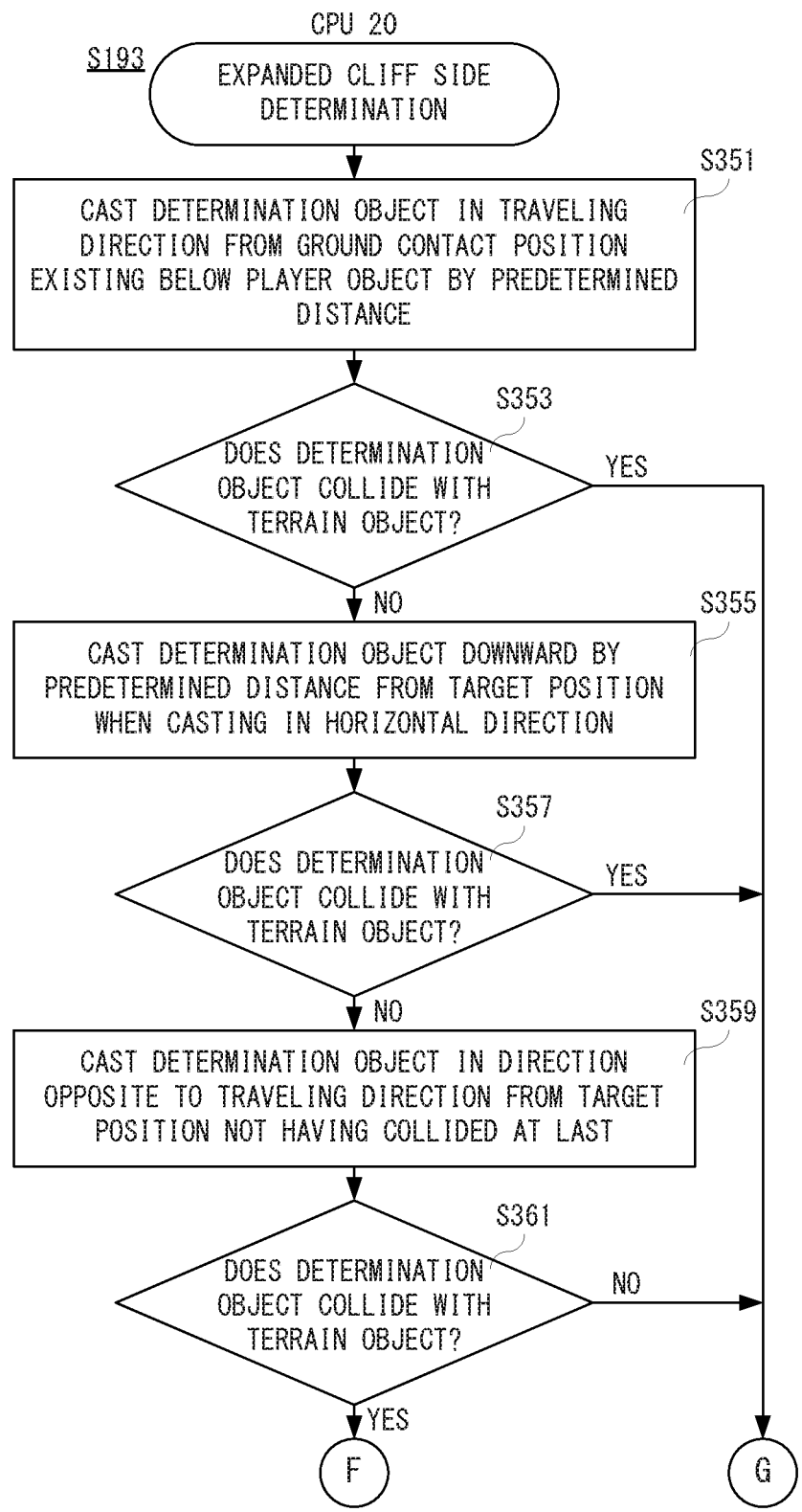
FIG. 31 is a flow chart showing a part of non-limiting example expanded cliff side determination processing of the CPU of the game apparatus shown in FIG. 2.
Figure 32:
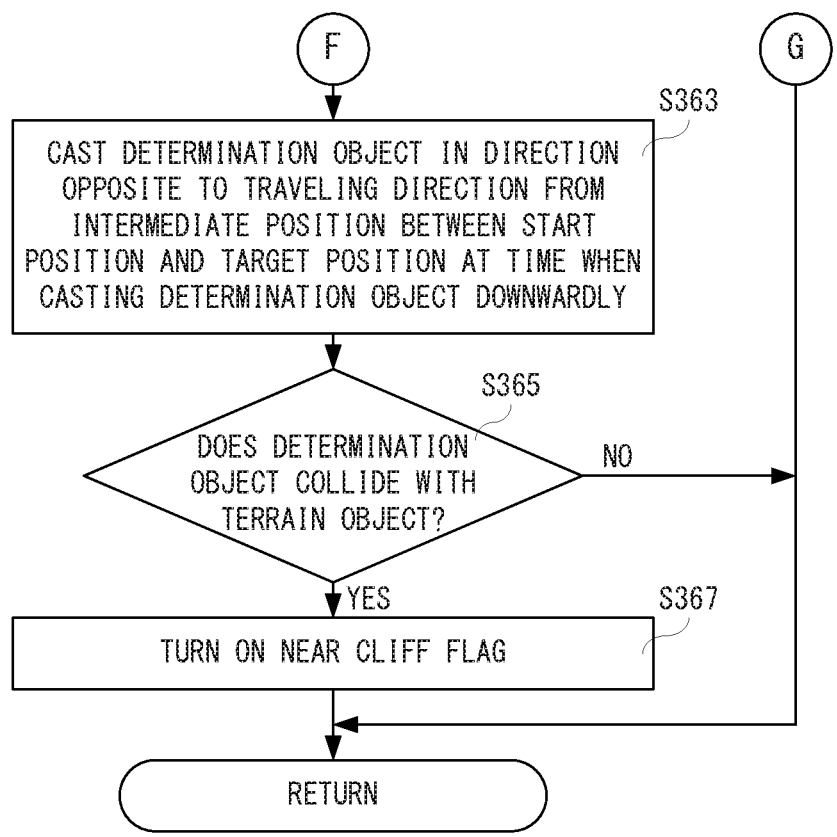
FIG. 32 shows another part of the expanded cliff side determining processing of CPU of the game apparatus shown in FIG. 2, following FIG. 31.

FIG. 31 and FIG. 32 are flow charts showing non-limiting example expanded cliff side determination processing in the step S193 of FIG. 29. As shown in FIG. 31, when the expanded cliff side determination processing is started, the CPU 20 casts the determination object 120 from a ground contact position existing below the player object 102 by the predetermined distance to the traveling direction in a step S351. Specifically, the CPU 20 decides a start position $P_a$ of a first time in the expanded cliff side determination processing to the collision position $C_m$ that is lower than the foot of the player object 102 and the difference H from the foot is equal to or larger than the predetermined distance h among the collision positions $C_m$ detected by casting the determination object 120 the predetermined number of times. Moreover, a position that is shifted by the predetermined distance d5 in the traveling direction from this start position $P_a$ as a target position $Q_a$. Then, the determination object 120 is cast toward the target position $Q_a$ from the start position $P_a$.

In a next step S353, it is determined whether the determination object 120 collides with the terrain object 104. If "YES" is determined in the step S353, it is determined that no cliff exists in the traveling direction of the player object 102, and the expanded cliff side determination processing is ended, and the process returns to the terrain surface information acquisition processing. On the other hand, if "NO" is determined in the step S353, in a step S355, the determination object 120 is cast downward by the determined distance from the target position $Q_a$ in case that the determination object 120 is cast horizontally. That is, the target position $Q_a$ is decided as a start position $P_b$ of a second time, and a position that is shifted by the predetermined distance d3 downward (just below) from the start position $P_b$ is decided as a target position $Q_b$. Then, the determination object 120 is cast toward the target position $Q_b$ from the start position $P_b$.

Furthermore, it is determined whether the determination object 120 collides with the terrain object 104 in a step S357. If "YES" is determined in the step S357, as shown in FIG. 32, the process returns to the terrain surface information acquisition processing. If "NO" is determined in the step S357, in a step S359, the determination object 120 is cast in a direction opposite to the traveling direction from the target position that the determination object 120 did not collides at the last. That is, the target position $Q_b$ is decided as a start position $P_c$ of a third time, and a position that is shifted from this start position $P_c$ by the predetermined distance d4 in a direction opposite to the traveling direction is decided as a target position $Q_c$. Then, the determination object 120 is cast toward the target position $Q_c$ from the start position $P_c$.

In a subsequent step S361, it is determined whether the determination object 120 collides with the terrain object 104. If "NO" is determined in the step S361, the process returns to the terrain surface information acquisition processing. On the other hand, if "YES" is determined in the step S361, in a step S363 shown in FIG. 32, the determination object 120 is cast from an intermediate position between the start position and the target position in case that the determination object 120 is cast downward in a direction opposite to the traveling direction. That is, the intermediate position between the start position $P_b$ and the target position $Q_b$ is decided as the start position $P_d$, and a position that is shifted from the start position $P_d$ by the predetermined distance d4 in a direction opposite to the traveling direction is decided as the target position $Q_d$. Then, the determination object 120 is cast toward the target position $Q_d$ from the start position $P_d$.

Then, it is determined, in a step S365, whether the determination object 120 collides with the terrain object 104. If "NO" is determined in the step S365, the process returns to the terrain surface information acquisition processing. On the other hand, if "YES" is determined in the step S365, the process returns to the terrain surface information acquisition processing after the near cliff flag 352 is turned on in a step S367.

According to this embodiment, positions that the determination object collides with the terrain object are detected by casting the determination object sequentially in the traveling direction of the player object toward the target position of the first time decided in advance and the target positions decided thereafter according to the predetermined rule, and an inclination and a height of the ground are calculated based on a plurality of collision positions, and therefore, it is possible to appropriately decide an animation of a character object such as the player object according to the terrain in the traveling direction of the player object, and to appropriately display a GUI for deciding an action of the character object.

Moreover, according to this embodiment, since the inclination of the terrain is calculated, it is not necessary to store inclination information of the terrain corresponding to each polygon constituting the terrain. Therefore, a work cost can be reduced and a memory capacity is not increased.

In addition, although the determination object 120 of a shape of a ball is used in this embodiment, a shape of the determination object 120 may be another three dimensional shape. For example, a determination object 120 in a shape of an oval sphere or regular polyhedron may be used.

Moreover, when deciding the next target position $Q_m$, calculation is made by using the reverse vector n' of the normal vector n at the last collision position $C_{m-1}$ in this embodiment, it does not need to be limited to this. In another method, a next target position $Q_m$ may be decided at a position that is shifted from a position that is shifted by a predetermined distance L1 and perpendicular to the normal vector n at the last time collision position $C_{m-1}$ in the traveling direction of the player object 102 by a predetermined distance L2 vertically downward. In addition, the predetermined distances L1 and L2 are experientially decided in advance by a simulation etc.

Furthermore, the structure of the game system shown in this embodiment is merely an example, and it does not need to be limited to this, and it is possible to adopt other structure. For example, it is also applicable to a portable game apparatus. Moreover, it is applicable to a desktop PC that is connected with a monitor, a notebook PC, a tablet PC or a smartphone, each having a game function.

Furthermore, in this embodiment, the image processing is performed on the game image for television, but the image processing may be performed on the game image to be displayed on the terminal device.

Moreover, specific numerical values and game screens (virtual space) shown in this embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A game apparatus, comprising:
a processing system that includes at least one hardware processor, the processing system configured to:
arrange terrain objects in a virtual space;
move a character object in the virtual space based on an operation of a player;
calculate collision positions for a plurality of determination regions, which each have a three-dimensional shape, that collide with at least one terrain object of the arranged terrain objects when the plurality of determination regions are moved in directions that are respectively decided according to predetermined rules from a plurality of positions that are relatively set from a position of the character object, wherein at least a first determination region of the plurality of determination regions is moved towards a target position that is determined based on a traveling direction of the character object within the virtual space and an angle with respect to the traveling direction;
determine, based on a distribution of a plurality of the collision positions, a terrain of the at least one terrain object within a predetermined range from the position of the character object; and
perform game processing according to the determined terrain.

2. The game apparatus according to the claim 1, wherein the plurality of determination regions includes at least one with a spherical shape.

3. The game apparatus according to the claim 1, wherein the processing system is further configured to:
control a direction of the character object based on an operation of the player, wherein the collision positions are calculated by moving each of the plurality of determination regions from a respective start position that is set in association with the position of the character object toward a respective target position that is decided to a side of the traveling direction of the character object.

4. The game apparatus according to the claim 3, wherein calculation of a first collision position of the collision positions includes deciding, based on the first collision position that is calculated in association with a predetermined determination region, a next target position for the predetermined determination region to a side of the traveling direction of the character object.

5. The game apparatus according to the claim 4, wherein the next target position is further shifted from another position that the predetermined determination region is moved by a first predetermined amount from the first collision position in a direction reverse to a normal direction of the at least one terrain object at the first position, by a second predetermined amount in a direction perpendicular to the direction of the normal direction and in the traveling direction of the character object.

6. The game apparatus according to the claim 4, wherein the next target position is further shifted from another position that the predetermined determination region is moved by a first predetermined amount from the first collision position in a direction perpendicular to a direction of a normal of the at least one terrain object at the first collision position and in the traveling direction of the character object, by a second predetermined amount in a vertically downward direction.

7. The game apparatus according to the claim 5, wherein the normal direction is recalculated based on an outer product of the normal direction of the at least one terrain object and a just beside direction of the traveling direction of the character object.

8. The game apparatus according to the claim 1, wherein the processing system is further configured to calculate at least an inclination of the terrain based on a distribution of a plurality of collision positions, wherein the game processing includes animation of the character object based on the calculated inclination.

9. The game apparatus according to the claim 8, wherein calculation of the inclination of the terrain includes performance of a principal component analysis of the distribution of the plurality of collision positions.

10. The game apparatus according to the claim 8, wherein calculation of the inclination of the terrain is based on calculation of a regression line based on the distribution of the plurality of collision positions.

11. The game apparatus according to the claim 3, wherein the processing system is further configured to determine, when a processing result in a case of moving at least one of the plurality of determination regions toward the target position from the start position satisfies a predetermined condition, whether there is a terrain that is looked down from the character object in the traveling direction of the character object.

12. The game apparatus according to the claim 11, wherein the processing system is further configured to set, when there is no collision between the terrain and the at least one of the plurality of determination regions, the target position as a next start position for the at least one of the plurality of determination regions and a next target position for the at least one of the plurality of determination regions in a downward direction from the next start position.

13. The game apparatus according to the claim 12, wherein the processing system is further configured to perform first determination processing that determines a side of the terrain to be looked down when there is no collision with the terrain in a case of moving the at least one of the plurality of determination regions toward the next target position from the next start position.

14. The game apparatus according to the claim 11, wherein the processing system is further configured to perform second determination processing that determines a side of the terrain to be looked down when a positional relation with the character object among a plurality of collision positions calculated in a case of moving the plurality of determination regions has a predetermined relationship.

15. A method performed by at least one hardware processor of a game apparatus, the method comprising:

moving a character object in a virtual space based on an operation of a player;

calculating a plurality of collision positions for a plurality of determination regions, which each have a three-dimensional shape, that collide with at least one terrain object of a plurality of terrain objects that are located within the virtual space, wherein the plurality of determination regions are moved in directions within the virtual space that are respectively decided according to predetermined rules from a plurality of positions that are relatively set from a position of the character object, wherein at least a first determination region of the plurality of determination regions is moved towards a target position that is determined based on a traveling direction of the character object within the virtual space and an angle with respect to the traveling direction;

determining a terrain of the at least one terrain object within a predetermined range from the position of the character object based on a distribution of the plurality of collision positions; and performing predetermined game processing according to the determined terrain.

16. A non-transitory storage medium storing a game program to be executed by a computer, wherein the game program comprises instruction that cause one or more processors to perform:

arranging terrain objects in a virtual space;

moving a character object in the virtual space based on an operation of a player;

calculating a plurality of collision positions for a plurality of determination regions, which each have a three-dimensional shape, that collide with at least one terrain object of the terrain objects, wherein calculation of the plurality of collision positions is further based on movement of the plurality of determination regions according to predetermined rules from a plurality of positions that are relatively set from a corresponding position of the character object, wherein at least a first determination region of the plurality of determination regions is moved towards a target position that is determined based on a traveling direction of the character object within the virtual space and an angle with respect to the traveling direction;

determining a terrain of the at least one terrain object within a predetermined range from the corresponding position of the character object based on a distribution of a plurality of collision positions; and performing predetermined game processing according to the determined terrain.

* * * * *